US010836248B2

(12) United States Patent
Song et al.

(10) Patent No.: US 10,836,248 B2
(45) Date of Patent: Nov. 17, 2020

(54) NOZZLE GUIDE FOR VEHICLE REFUELING ADAPTER

(71) Applicant: Ford Global Technologies, LLC, Dearborn, MI (US)

(72) Inventors: Xiankai Song, Canton, MI (US); Rodolfo Palma, Canton, MI (US); Michael Zitkovic, Jr., Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 21 days.

(21) Appl. No.: 15/996,260

(22) Filed: Jun. 1, 2018

(65) Prior Publication Data

US 2019/0255939 A1   Aug. 22, 2019

Related U.S. Application Data

(60) Provisional application No. 62/633,493, filed on Feb. 21, 2018.

(51) Int. Cl.
*B60K 15/04* (2006.01)
*B67D 7/42* (2010.01)

(52) U.S. Cl.
CPC ............. *B60K 15/04* (2013.01); *B67D 7/42* (2013.01); *B60K 2015/0461* (2013.01)

(58) Field of Classification Search
CPC ............ B60K 15/04; B60K 15/0406; B60K 2015/0419; B60K 2015/0429; B60K 2015/0422; B60K 2015/0445; B60K 2015/0461; B60K 2015/0464; B60K 2015/0483; B60K 2015/049; B60K 15/05; B67D 7/42; B67D 7/048; B67C 3/16; B67C 2003/2602; B67C 2003/2651; B65D 77/06

USPC .............. 141/44, 50, 312, 348–350, 392
See application file for complete search history.

(56) References Cited

U.S. PATENT DOCUMENTS

| 5,839,489 | A | * | 11/1998 | Ganachaud | ............ | B60K 15/04 141/382 |
| 5,860,460 | A | * | 1/1999 | Hidano | .................. | B60K 15/04 141/286 |
| 8,910,678 | B2 | * | 12/2014 | Cisternino | ............. | B60K 15/04 141/350 |

(Continued)

FOREIGN PATENT DOCUMENTS

| JP | 5200586 B2 | * | 6/2013 |
| JP | 2015199466 A | * | 11/2015 |
| JP | 2016064779 A | * | 4/2016 |

OTHER PUBLICATIONS

JP-5200586-B2 English Translation of Specification (Year: 2013).*

(Continued)

*Primary Examiner* — Marina A Tietjen
*Assistant Examiner* — Stephanie A Shrieves
(74) *Attorney, Agent, or Firm* — Geoffrey Brumbaugh; McCoy Russell LLP

(57) ABSTRACT

Methods and systems are provided for nozzle guides for vehicle refueling adapters. In one example, a nozzle guide includes a plurality of protrusions adapted to center a fuel nozzle within the nozzle guide and to reduce a likelihood of over-insertion of the fuel nozzle into the nozzle guide. The nozzle guide may include features such as a rear guard and upper wall adapted to reduce ingression of liquid fuel with fuel vapor flowing from the fuel tank.

18 Claims, 23 Drawing Sheets

(56) References Cited

U.S. PATENT DOCUMENTS

| | | | | |
|---|---|---|---|---|
| 8,950,615 | B2* | 2/2015 | Aitken | B60K 15/04 220/86.2 |
| 9,216,891 | B2* | 12/2015 | Chretien | B67D 7/06 |
| 2007/0210607 | A1* | 9/2007 | Murabayashi | B60K 15/03519 296/97.22 |
| 2011/0079322 | A1* | 4/2011 | Beier | B60K 15/0406 141/350 |
| 2012/0024422 | A1* | 2/2012 | Cisternino | B60K 15/04 141/349 |
| 2013/0213963 | A1* | 8/2013 | Chretien | B67D 7/06 220/86.2 |
| 2014/0230962 | A1* | 8/2014 | Kito | B67D 7/42 141/311 R |
| 2015/0096983 | A1* | 4/2015 | Moy | B60K 15/03519 220/86.2 |
| 2015/0158379 | A1* | 6/2015 | Stancu | B60K 15/04 220/86.2 |
| 2016/0075230 | A1* | 3/2016 | Goto | B60K 15/04 220/86.2 |
| 2016/0272063 | A1* | 9/2016 | Sekihara | B60K 15/04 |
| 2017/0190248 | A1* | 7/2017 | Kikuya | B60K 15/04 |
| 2017/0232837 | A1* | 8/2017 | Kito | B60K 15/04 220/86.2 |
| 2018/0105414 | A1* | 4/2018 | Kubo | F02M 37/0076 |

OTHER PUBLICATIONS

JP-2015199466-A English Translation of Specification (Year: 2015).*
JP-2016064779-A English Translation of Specification (Year: 2016).*
Song, X. et al., "Insert for a Fuel Tank Filler Pipe," U.S. Appl. No. 15/898,131, filed Feb. 15, 2018, 82 pages.
Zitkovic, M. et al., "Funnel for a Fuel Tank Filler Pipe," U.S. Appl. No. 15/898,150, filed Feb. 15, 2018, 81 pages.

* cited by examiner

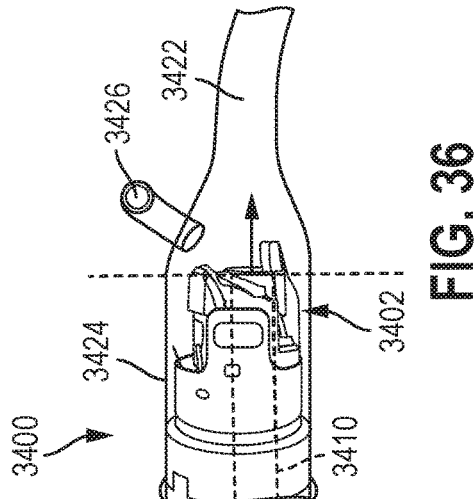
FIG. 34
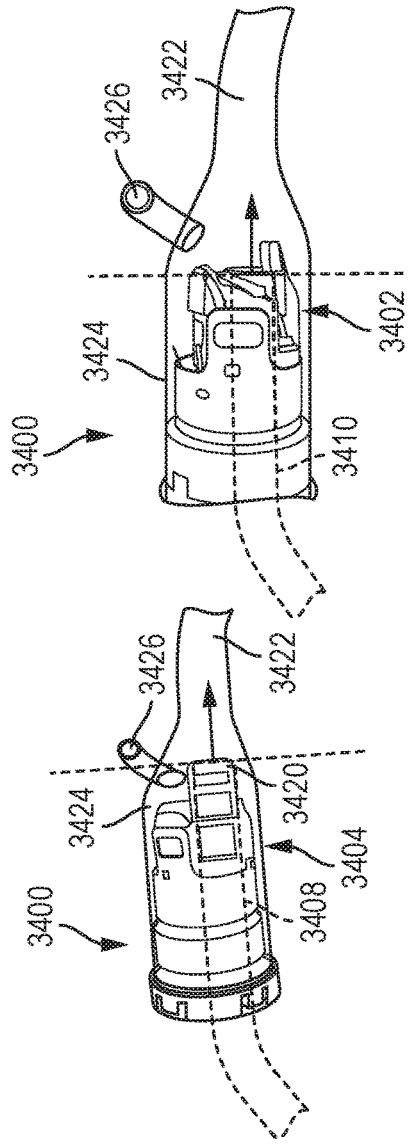
FIG. 35
FIG. 36
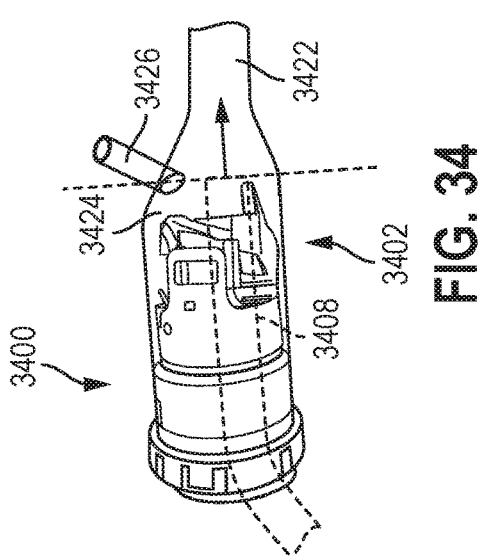
FIG. 37
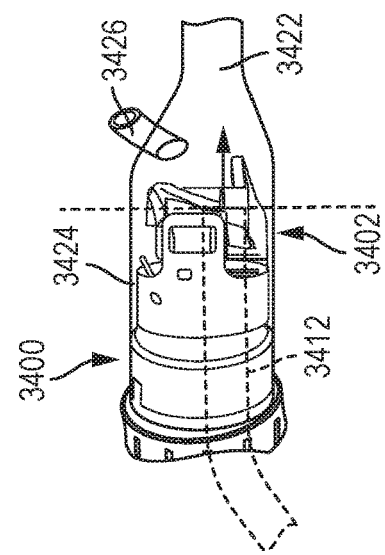
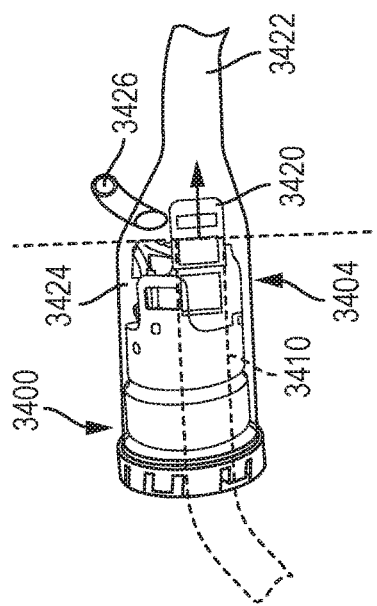
FIG. 38

NOZZLE GUIDE FOR VEHICLE REFUELING ADAPTER

CROSS REFERENCE TO RELATED APPLICATION

The present application claims priority to U.S. Provisional Application No. 62/633,493, entitled "FLOW GUIDE FOR VEHICLE REFUELING ADAPTER" and filed on Feb. 21, 2018. The entire contents of the above-listed application are hereby incorporated by reference for all purposes.

FIELD

The present description relates generally to methods and systems for nozzle guides for vehicle refueling adapters.

BACKGROUND/SUMMARY

A vehicle including an internal combustion engine commonly includes a fuel tank for supplying fuel to the engine. The fuel tank may be filled with fuel by an operator of the vehicle via a fuel passage extending between the fuel tank and an exterior fuel opening of the vehicle. A refueling mechanism may be mounted inside the fuel opening to provide an interface between the fuel passage and a fuel nozzle coupled to an external fuel source. Some refueling mechanisms are referred to as capless adapters and include one or more non-removable elements, such as pivotable doors, configured to seal the fuel passage from atmosphere while the vehicle is not being refueled.

However, the inventors herein have recognized potential issues with such systems. As one example, the refueling mechanism may not include elements for guiding the fuel nozzle through the refueling mechanism during refueling. As a consequence, it may be difficult to adequately position the fuel nozzle within the refueling mechanism, which may result in an incomplete filling of the fuel tank. Additionally, it may be difficult for an operator of the fuel nozzle to determine whether the fuel nozzle is correctly seated within the refueling mechanism during refueling. Under insertion or over insertion of the fuel nozzle may occur, resulting in issues such as increased fuel backflow, pre-mature fuel nozzle shut-off, etc. Further, some refueling mechanisms may include multiple funnels, which may result in increased interference with the flow of fuel from the fuel nozzle and/or loss of hydrodynamic energy of the fuel.

In one example, the issues described above may be addressed by a nozzle guide for a vehicle refueling adapter, comprising: a plurality of flexible protrusions adapted to guide a fuel nozzle to a centered position within the nozzle guide; and a rear guard positioned to partially surround the fuel nozzle while the fuel nozzle is in the centered position and to guide fuel vapor around the nozzle guide. In this way, the fuel nozzle may be centered in the nozzle guide and vehicle refueling adapter by the protrusions, and fuel nozzle performance may be increased.

As one example, the protrusions may form a space positioned to enclose a shut-off aspirator of the fuel nozzle. Fuel from the fuel nozzle may flow out of the nozzle guide via the space between the protrusions, and a likelihood of pre-mature fuel nozzle shut-off may be reduced. Further, a likelihood of hydrodynamic energy loss of the fuel flowing from the fuel nozzle may be decreased.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 34-37 show different side views of various fuel nozzles inserted into refueling adapters of fuel filler inlets, with each refueling adapter including a nozzle guide.

FIGS. 38-42 illustrate a direction of recirculation fuel flow through refueling adapters including nozzle guides.

FIGS. 2-44 are shown to scale, though other relative dimensions may be used.

DETAILED DESCRIPTION

The following description relates to systems and methods for nozzle guides (which may be referred to herein as flow guides and/or nozzle flow guides) for vehicle refueling adapters. A vehicle, such as the vehicle shown by FIG. 1, includes a filler inlet fluidly coupled to a fuel tank. The filler inlet includes a refueling adapter, such as the refueling adapter shown by FIGS. 2-5, configured to receive a fuel nozzle. The refueling adapter includes a nozzle guide, such as the nozzle guide shown by FIGS. 6-19 or the nozzle guide shown by FIGS. 20-33. The nozzle guide includes a plurality of protrusions and other elements adapted to correct a position of the fuel nozzle within the refueling adapter and to guide a flow of fuel from the fuel nozzle through the refueling adapter. Further, fuel nozzles having different diameters and/or lengths may be centered within the refueling adapter via the nozzle guide, as shown by FIGS. 34-37 and FIGS. 43-44. The nozzle guide guides a flow of fuel and fuel vapor through the filler inlet, as shown by FIGS. 39-42. As a result, a flow rate of the fuel may be increased and a likelihood of pre-mature fuel nozzle shut-off may be decreased.

Figure 1:
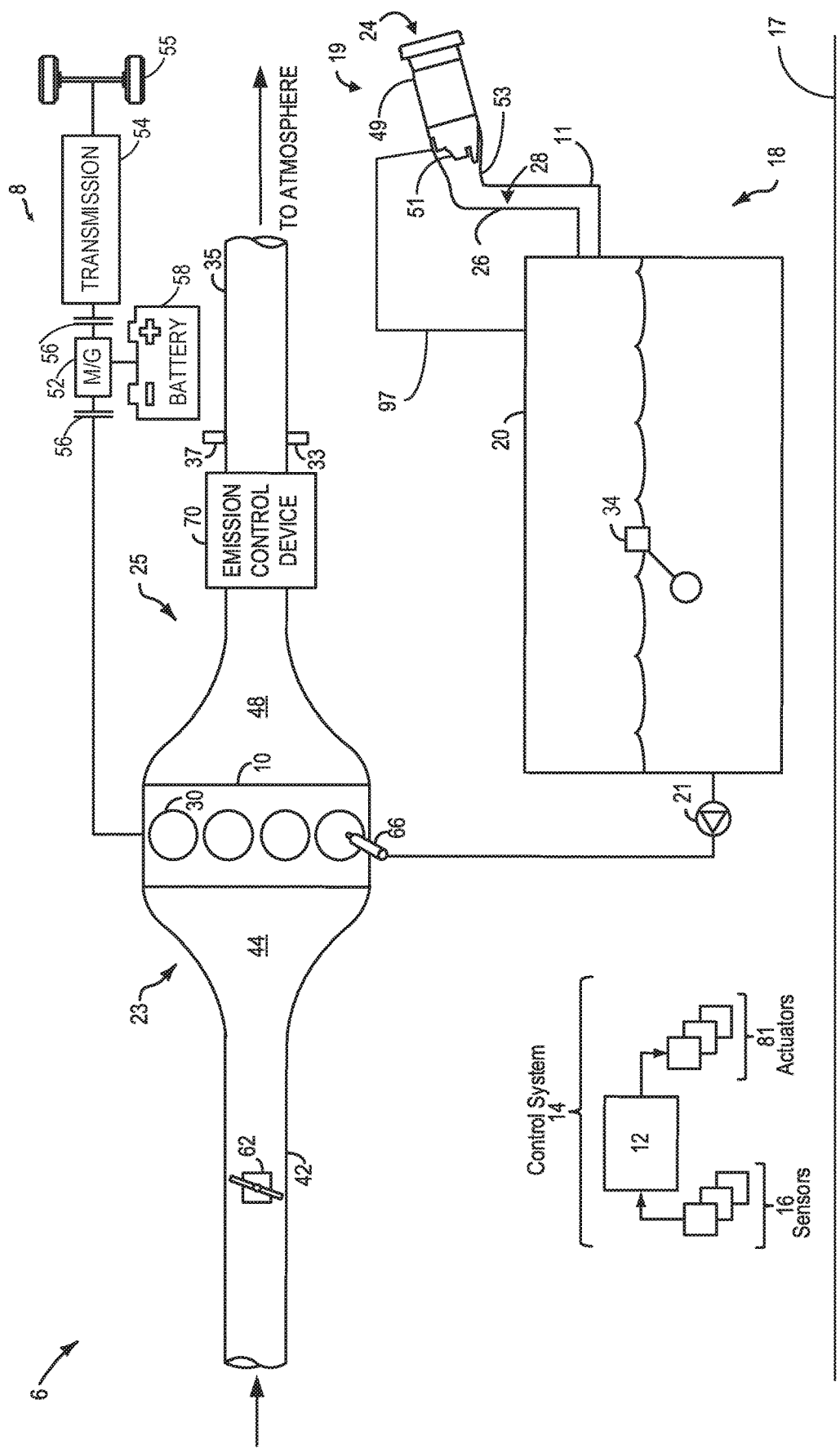
FIG. 1 schematically shows an engine system of a vehicle including a refueling adapter coupled to a fuel filler inlet.

Referring now to FIG. 1, a schematic depiction of a vehicle system 6 is shown. The vehicle system 6 includes an engine system 8 coupled to a fuel system 18. In some examples, vehicle system 6 may be a diesel vehicle. In other examples, the vehicle system 6 may be a vehicle configured to combust gasoline via engine system 8. A surface on which the vehicle system 6 sits is depicted as ground surface 17.

The engine system 8 includes an engine 10 having a plurality of cylinders 30. Cylinders 30, or combustion chambers, may receive intake air from an intake manifold 44 via an intake passage 42 and may exhaust combustion gases via an exhaust manifold 48 to exhaust passage 35. The intake manifold 44 and the exhaust manifold 48 can selectively communicate with the cylinders 30 via intake valves (not shown) and exhaust valves (not shown), respectively. In some embodiments, each of the cylinders 30 may include two or more intake valves and/or two or more exhaust valves.

The engine intake 23 includes a throttle 62 fluidly coupled to the engine intake manifold 44 via the intake passage 42. In one example, the position of the throttle 62 may be varied by a controller 12 via a signal provided to an electric motor or actuator included with the throttle 62, a configuration that is commonly referred to as Electronic Throttle Control (ETC). In this manner, the throttle 62 may be operated to vary the intake air provided to the cylinders 30.

In some embodiments, each cylinder of the engine 10 may be configured with one or more fuel injectors for providing fuel thereto. As a non-limiting example, the cylinder 30 is shown including one fuel injector 66. Fuel injector 66 is shown coupled to the cylinder 30 for injecting fuel directly therein. While only a single injector 66 is shown, additional injectors are provided for each cylinder. In this manner, fuel injector 66 provides what is known as direct injection of fuel into combustion chamber 30. Fuel may be delivered to fuel injector 66 by a fuel system 18 including a fuel tank, a fuel pump, and a fuel rail, discussed below.

In one example, the engine 10 may be a diesel engine that combusts air and diesel fuel through compression ignition. In other non-limiting embodiments, the engine 10 may combust a different fuel including gasoline, biodiesel, or an alcohol containing fuel blend (e.g., gasoline and ethanol or gasoline and methanol) through compression ignition and/or spark ignition. Thus, the embodiments described herein may be used in any suitable engine, including but not limited to, diesel and gasoline compression ignition engines, spark ignition engines, direct or port injection engines, etc.

The engine exhaust 25 may include one or more emission control devices 70, which may be mounted in a close-coupled position in the exhaust. One or more emission control devices may include a three-way catalyst, lean NOx trap, diesel particulate filter, oxidation catalyst, etc. It will be appreciated that other components may be included in the engine such as a variety of valves and sensors.

Fuel system 18 may include a fuel tank 20 coupled to a fuel pump assembly 21. The fuel pump assembly 21 may include one or more pumps for pressurizing fuel delivered to the injectors of engine 10, such as the example injector 66 shown. It will be appreciated that fuel system 18 may be a return-less fuel system, a return fuel system, or various other types of fuel system. Fuel tank 20 may hold diesel fuel. In other embodiments, fuel tank 20 may hold a plurality of fuel blends, including fuel with a range of alcohol concentrations, such as various gasoline-ethanol blends, including E10, E85, gasoline, etc., and combinations thereof. A fuel level sensor 34 located in fuel tank 20 may provide an indication of the fuel level ("Fuel Level Input") to controller 12. As depicted, fuel level sensor 34 may comprise a float connected to a variable resistor. Alternatively, other types of fuel level sensors may be used.

Further, a fuel filler system, herein also termed a refueling assembly 19, is provided. Refueling assembly 19 is coupled to fuel tank 20 via a fuel line 11, and may be further coupled to fuel tank 20 by recirculation passage 97 configured to enable fuel vapor to flow from the fuel tank 20 to the refueling assembly 19. In the example shown schematically by FIG. 1, the refueling assembly 19 includes a refueling adapter 49 positioned within filler neck 53 of a filler pipe 26 coupled to fuel line 11. In some examples, Refueling adapter 49 includes an opening 24 adapted to receive a fuel nozzle in order to flow fuel from the fuel nozzle into the fuel tank 20 via fuel line 11. In the example shown, the refueling adapter 49 is a capless refueling adapter that includes one or more pivotable doors biased toward a fully closed position during conditions in which the fuel nozzle is not inserted into the refueling adapter 49. As the fuel nozzle is pressed against the one or more pivotable doors of the refueling adapter 49, the fuel nozzle may pivot the doors to an opened position in order to be inserted into the refueling adapter 49. The one or more pivotable doors may be biased toward the fully closed position (e.g., a position in which the pivotable doors seal an interior of the refueling adapter 49 from atmospheric air) by one or more biasing members (e.g., springs). Further, during conditions in which the fuel nozzle is removed from the refueling adapter 49, the one or more pivotable doors may return to the fully closed position via the biasing members. Thus, the one or more pivotable doors may automatically close without assistance from a refueling operator (e.g., a driver of the vehicle). In other examples, the refueling adapter 49 may not be a capless refueling adapter and may instead be sealed from atmosphere via a removable sealing device (e.g., a cap or cover). The refueling adapter 49 may also include a locking mechanism in some examples (e.g., a lockable cap, lockable door, etc.). The locking mechanism (e.g., fuel cap locking mechanism) may be configured to automatically lock the fuel cap in a closed position so that the fuel cap cannot be opened while the vehicle is in motion, and may be unlocked by an operator of the vehicle (e.g., via a key, electronic actuator, etc.)

Refueling assembly 19 includes filler pipe 26, wherein filler pipe 26 comprises an inner circumference 28 (which may herein be referred to as inner perimeter 28). Filler pipe 26 is in fluidic communication with fuel tank 20 via fuel line 11, as shown in FIG. 1. The refueling assembly 19 further includes a nozzle guide 51 (which may be referred to herein as a flow guide and/or nozzle flow guide) coupled to the refueling adapter 49 at a position downstream of the one or more pivotable doors. The nozzle guide may be at least partially enclosed by filler pipe 26. The refueling assembly 19 is configured such that the fuel-nozzle may be inserted into the refueling adapter 49 and maintained in a centered position within the refueling adapter 49 at least in part by nozzle guide 51. In this position, the fuel nozzle may flow fuel into the fuel line 11 to refuel fuel tank 20. Nozzle guide 51 guides the fuel nozzle to the centered position within the refueling adapter 49. Further, nozzle guide 51 guides the flow of fuel from the fuel nozzle toward the fuel line 11. Examples of refueling adapters similar to refueling adapter 49 and nozzle guides similar to nozzle guide 51 are described further below with reference to FIGS. 2-44.

Controller 12 may comprise a portion of a control system 14. As such, controller 12 may be a microcomputer, including a microprocessor unit (not shown), input/output ports (not shown), an electronic storage medium for executable programs and calibrations values as a read only memory chip (not shown), random access memory (not shown), keep alive memory (not shown), and a data bus. Control system 14 is shown receiving information from a plurality of sensors 16 and sending control signals to a plurality of actuators 81. The controller 12 receives signals from the various sensors of FIG. 1 and employs the various actuators of FIG. 1 to adjust engine operation based on the received signals and instructions stored on a memory of the controller. For example, the controller may receive input data from the various sensors, process the input data, and trigger the actuators in response to the processed input data based on instruction or code programmed therein corresponding to one or more routines. As one example, sensors 16 may include exhaust gas sensor 37 located upstream of the emission control device, and temperature sensor 33. Other sensors such as pressure, temperature, air/fuel ratio, and composition sensors may be coupled to various locations in the vehicle system 6. As another example, the actuators may include fuel injector 66, throttle 62, and one or more pumps of fuel pump assembly 21.

In some examples, vehicle system 6 may be a hybrid vehicle with multiple sources of torque available to one or more vehicle wheels 55. In other examples, vehicle system 6 is a conventional vehicle with only an engine, or an electric vehicle with only electric machine(s). In the example shown, vehicle system 6 includes engine 10 and an electric machine 52. Electric machine 52 may be a motor or a motor/generator. A crankshaft of engine 10 and electric machine 52 are each connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect the crankshaft from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

Figure 2:
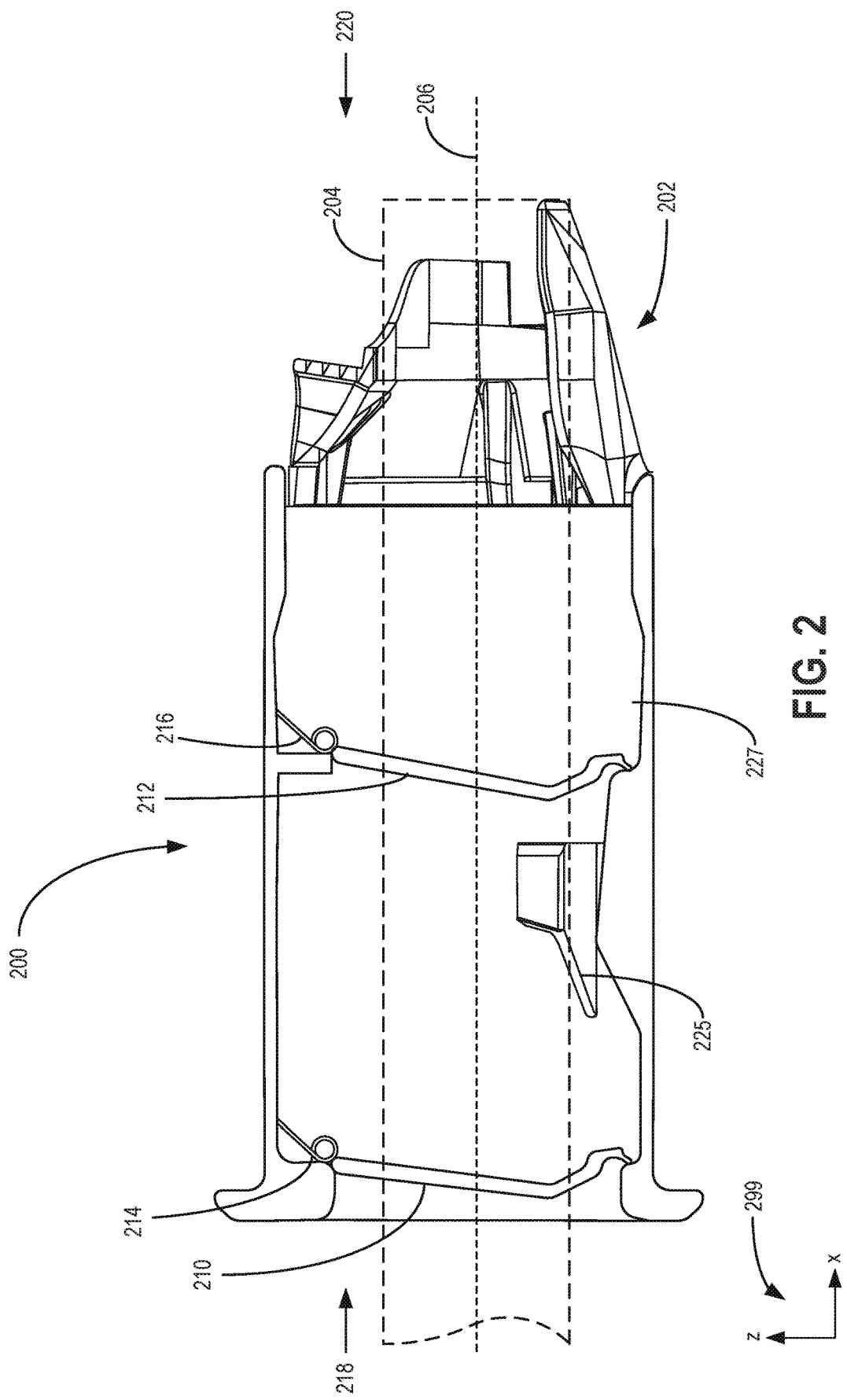
FIGS. 2-5 show different side and cross-sectional views of a refueling adapter for a vehicle, the refueling adapter including a nozzle guide.
Figure 3:
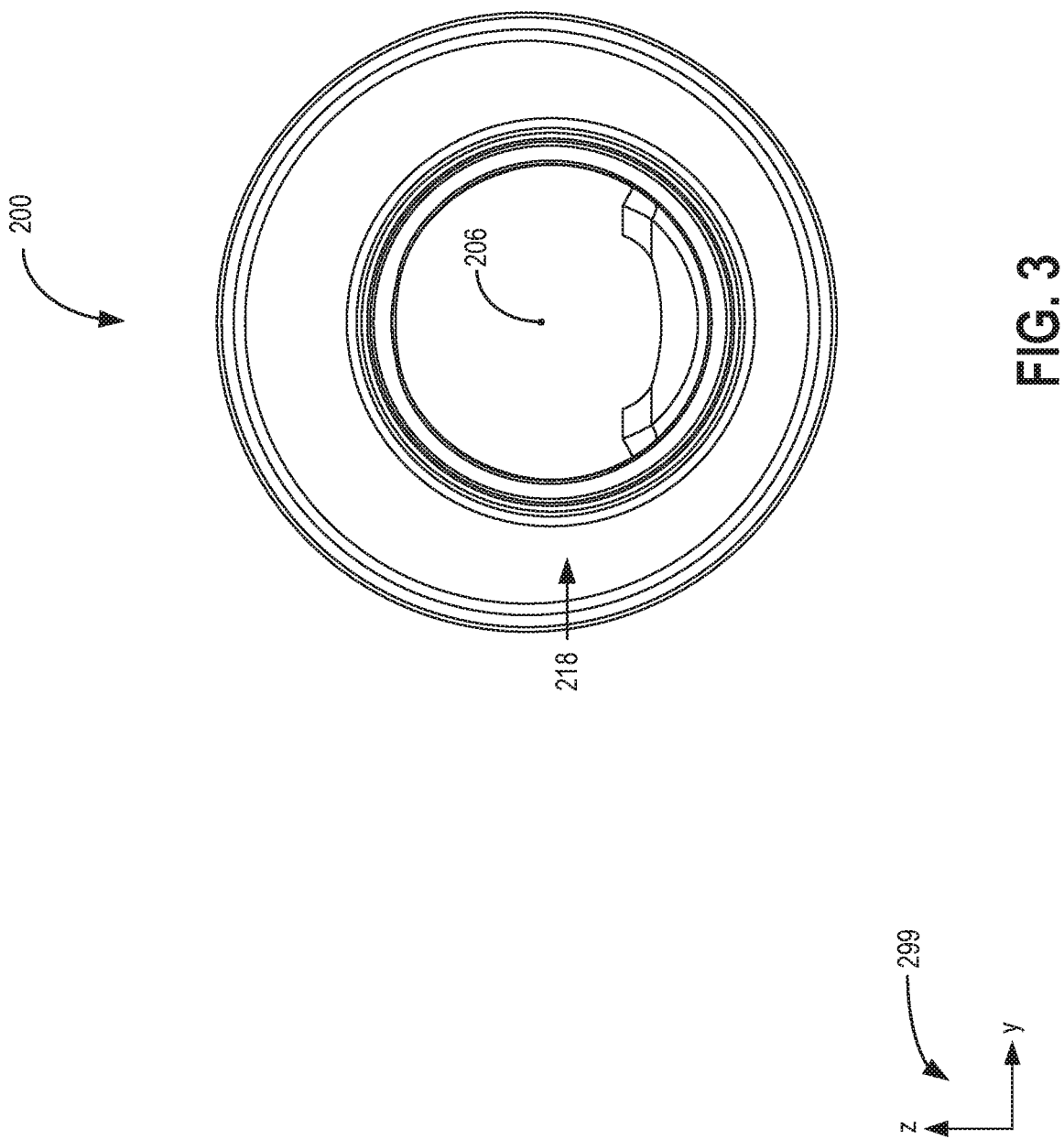
Figure 4:
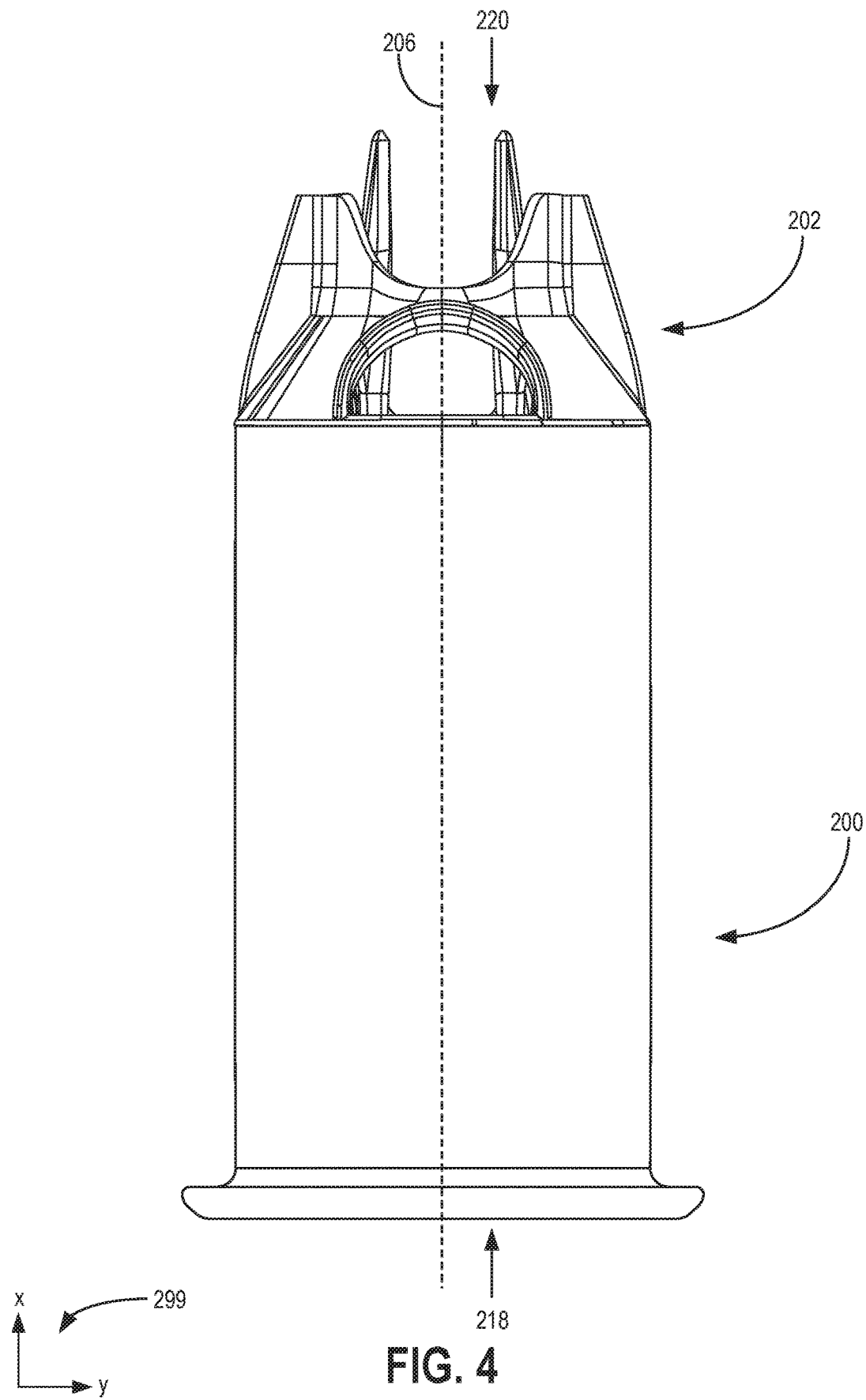
Figure 5:
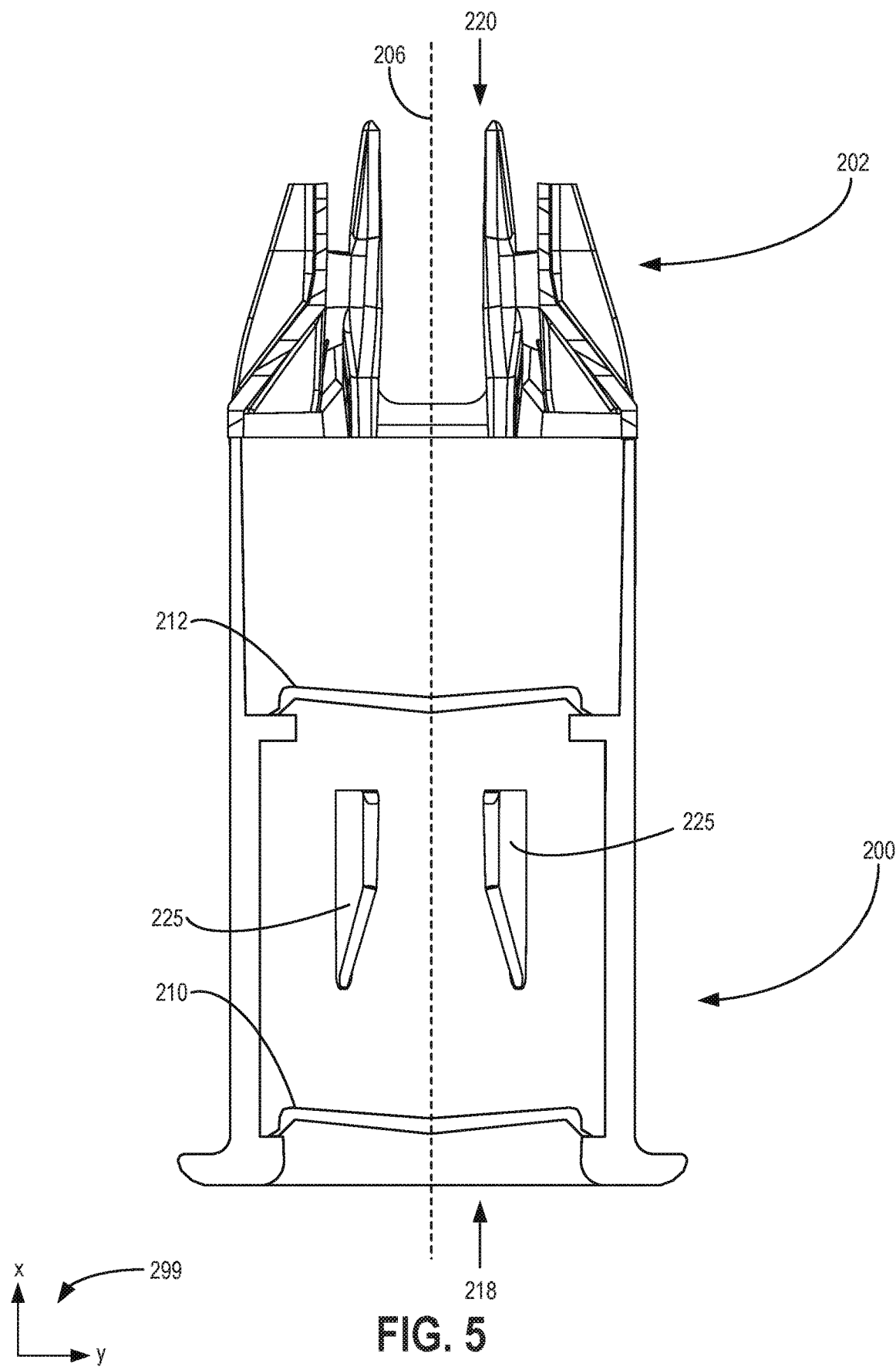

Turning now to FIGS. 2-5, an example refueling adapter 200 of a vehicle is shown. Each of FIGS. 2-5 includes reference axes 299 for comparison of the various views shown. FIG. 2 shows a side cross-sectional view of refueling adapter 200, FIG. 3 shows a front view of refueling adapter 200, FIG. 4 shows a top view of refueling adapter 200, and FIG. 5 shows a top cross-sectional view of refueling adapter 200. Refueling adapter 200 may be similar to the refueling adapter 49 described above with reference to FIG. 1. The refueling adapter 200 is a capless refueling adapter, similar to the example described above with reference to FIG. 1. Specifically, the refueling adapter 200 includes a plurality of pivotable doors configured to seal the refueling adapter 200 from atmosphere during conditions in which a fuel nozzle is not inserted into the refueling adapter 200. For example, the refueling adapter 200 includes a first pivotable door 210 and a second pivotable door 212, with the second pivotable door 212 being positioned downstream of the first pivotable door 210 relative to a direction of insertion of the fuel nozzle into the refueling adapter 200. A position of the fuel nozzle during conditions in which the fuel nozzle is inserted into the refueling adapter 200 is indicated by outline 204. While the fuel nozzle is in the position indicated by outline 204, the first pivotable door 210 and second pivotable door 212 are pivoted away from an axis 206 on which the fuel nozzle is centered. Each of the first pivotable door 210 and second pivotable door 212 may be biased towards a fully closed position by respective biasing members. For example, the first pivotable door 210 may be biased towards the fully closed position by a first biasing member 214 (e.g., a first spring), and the second pivotable door 212 may be biased towards the fully closed position by a second biasing member 216 (e.g., a second spring). In the example shown by FIG. 2, the first pivotable door 210 and the second pivotable door 212 are shown in the fully closed position.

In some examples, the refueling adapter 200 may include a plurality of elements configured to guide the fuel nozzle into the center position with respect to the axis 206. Further, refueling adapter 200 is shown coupled with nozzle guide 202 (which may be referred to herein as a flow guide and/or nozzle flow guide). Nozzle guide 202 is positioned at a second end 220 of the refueling adapter 200 (e.g., coupled to the refueling adapter 200 at the second end 220), with the first pivotable door 210 being positioned at a first end 218 opposite to the second end. In some examples, refueling adapter 200 and nozzle guide 202 may be formed of different materials (e.g., the refueling adapter 200 may be formed from a first material and the nozzle guide 202 may be formed from a different, second material). Nozzle guide 202 is described in more detail further below with reference to FIGS. 6-19. In some examples, the refueling adapter 200 and nozzle guide 202 may be formed as separate pieces. For example, the nozzle guide 202 may include features configured to mate with corresponding features of the refueling adapter 200 in order to couple the nozzle guide 202 to the refueling adapter 200. In other examples, the refueling adapter 200 and the nozzle guide 202 may be formed together as a single piece (e.g., molded together as a single unit). However, by forming the refueling adapter 200 and the nozzle guide 202 as separate pieces, the nozzle guide 202 may be adapted to couple to a variety of different refueling adapters. For example, nozzle guide 202 may be adapted to couple to refueling adapters configured to receive diesel fuel nozzles, refueling adapters configured to receive gasoline fuel nozzles, and/or refueling adapters configured to receive a different type of fuel nozzle (e.g., fuel nozzles having different diameters, lengths, etc.).

In some examples, one or more of the pivotable doors of the refueling adapter 200 may be shaped in order to guide the nozzle toward the centered position along axis 206. For example, the pivotable doors may include depressions (e.g., recesses) shaped to adjust a position of the fuel nozzle within the refueling adapter 200 as the fuel nozzle presses against the pivotable doors. Other features, such as ribs 225 shown by FIG. 2, may further guide the fuel nozzle toward the centered position (e.g., the position shown by outline 204). The refueling adapter 200 may additionally and/or alternately include a plurality of pivotable arms configured to obstruct fuel nozzles having an undesirable size, length, etc. from being inserted into the refueling adapter 200. For example, the pivotable arms may pivot away from the axis 206 during conditions in which a fuel nozzle having a first pre-determined diameter is inserted into the refueling adapter 200 (e.g., a gasoline fuel nozzle), and may not pivot away from the axis 206 during conditions in which a fuel nozzle having a second pre-determined diameter is pressed against the first pivotable door 210 (e.g., a diesel fuel nozzle). In this configuration, the pivotable arms may reduce a likelihood of inserting a fuel nozzle into the refueling adapter to fill the fuel tank of the vehicle with an undesirable fuel (e.g., to reduce a likelihood of filling a fuel tank of a gasoline vehicle with diesel fuel).

A bottom portion 227 of the refueling adapter 200 may be shaped to enable an increased amount of clearance for a fuel nozzle to be inserted into the refueling adapter 200 without resulting in interference with a shut-off aspirator (e.g., opening) of the fuel nozzle. For example, the refueling nozzle may include the opening positioned toward an end of the fuel nozzle through which fuel is dispensed, and during conditions in which the opening is covered (e.g., blocked by a backflow of fuel or otherwise obstructed), the fuel nozzle may shut-off in response to the opening being covered in order to reduce a likelihood of fuel overflow. By forming the refueling adapter 200 with the bottom portion 227, a likelihood of pre-mature fuel nozzle shut-off may be reduced by increasing an amount of open space surrounding the opening.

Figure 7:
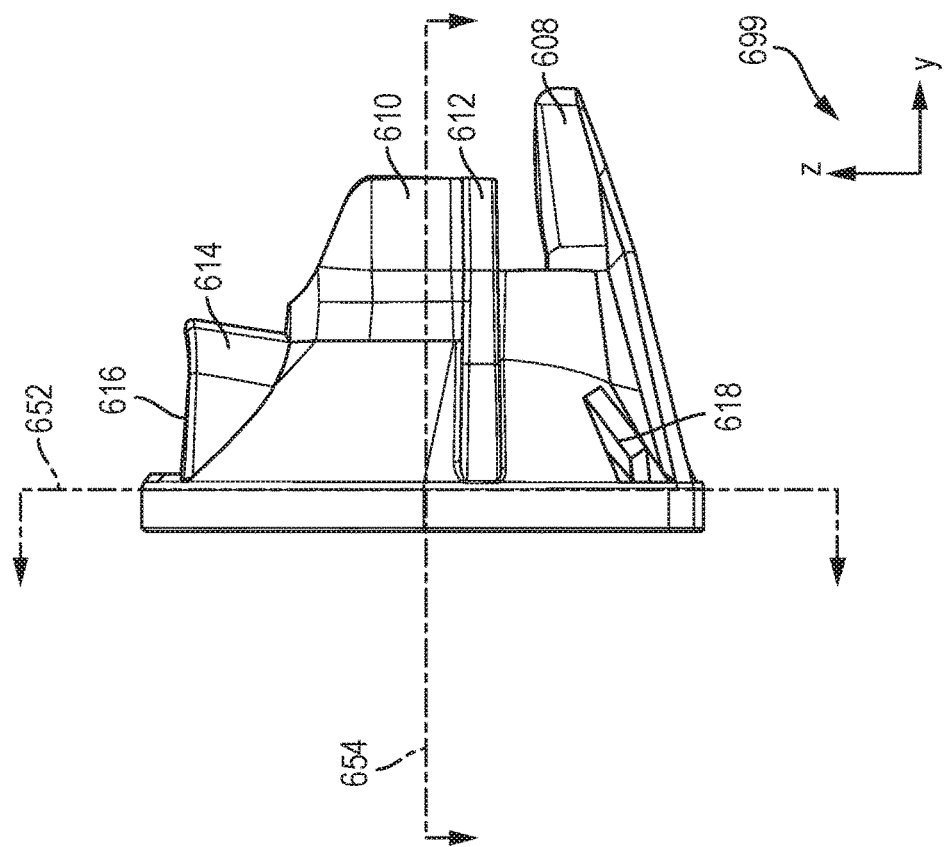
FIGS. 6-19 show different side, cross-sectional, and perspective views of a nozzle guide for a refueling adapter.
Figure 6:
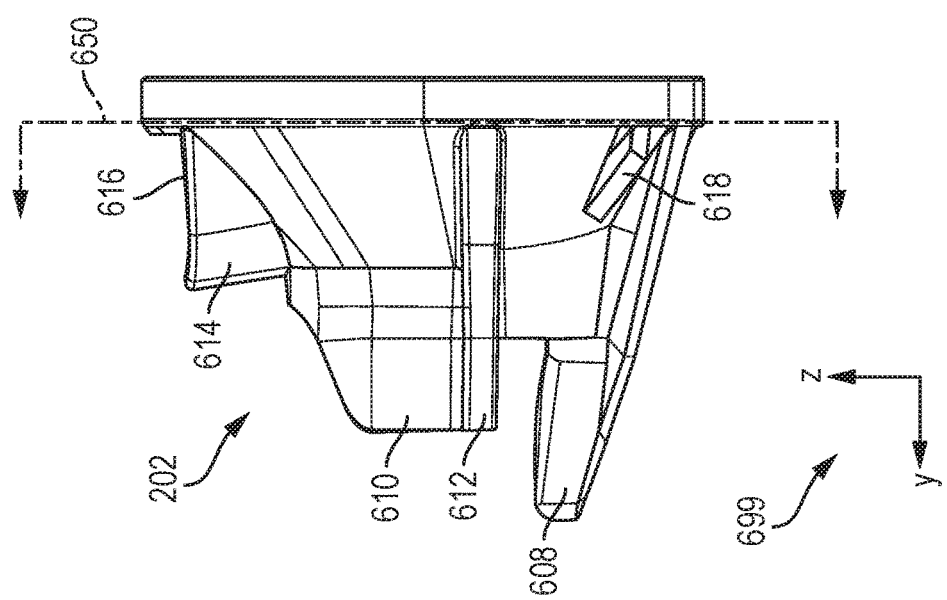
Figure 9:
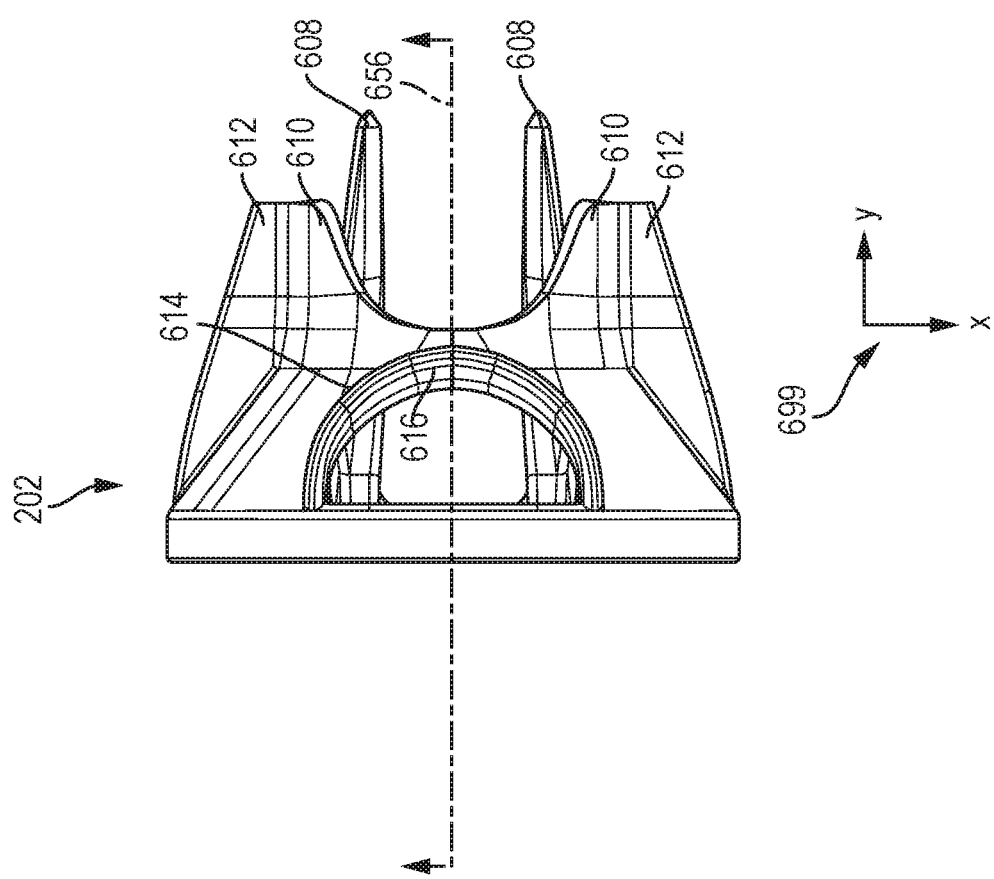
Figure 8:
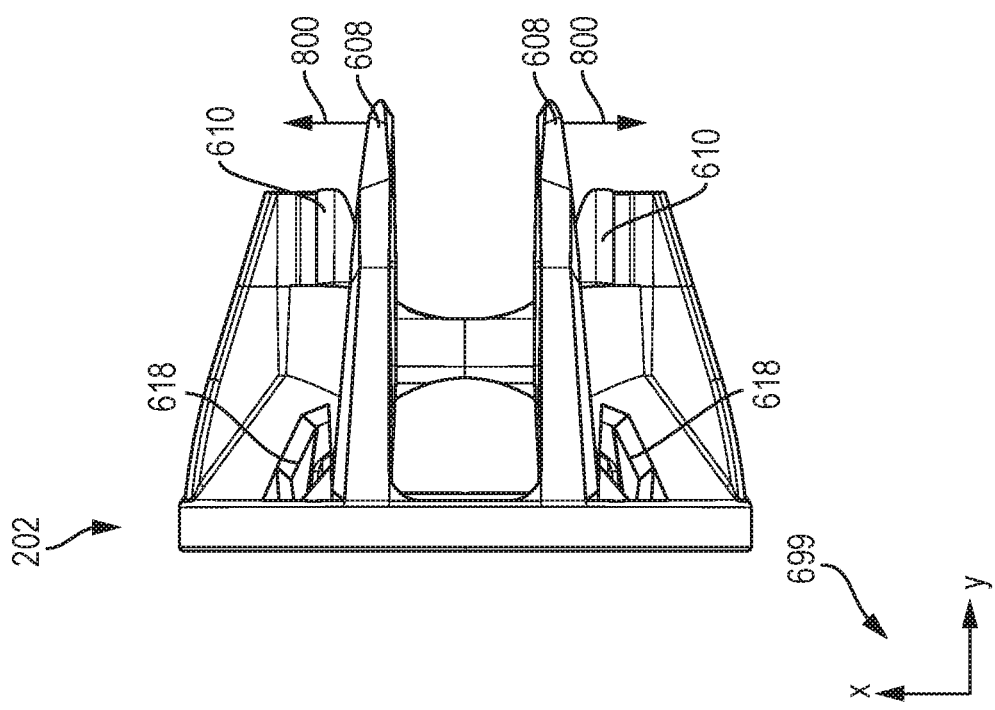
Figure 11:
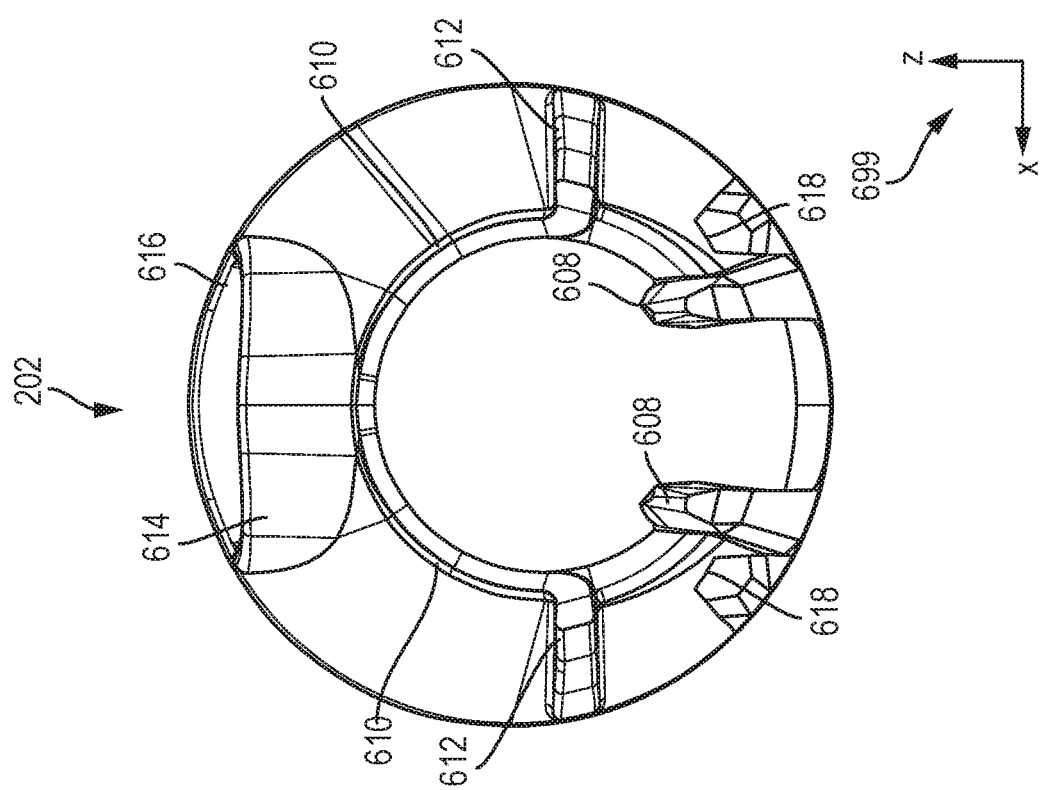
Figure 10:
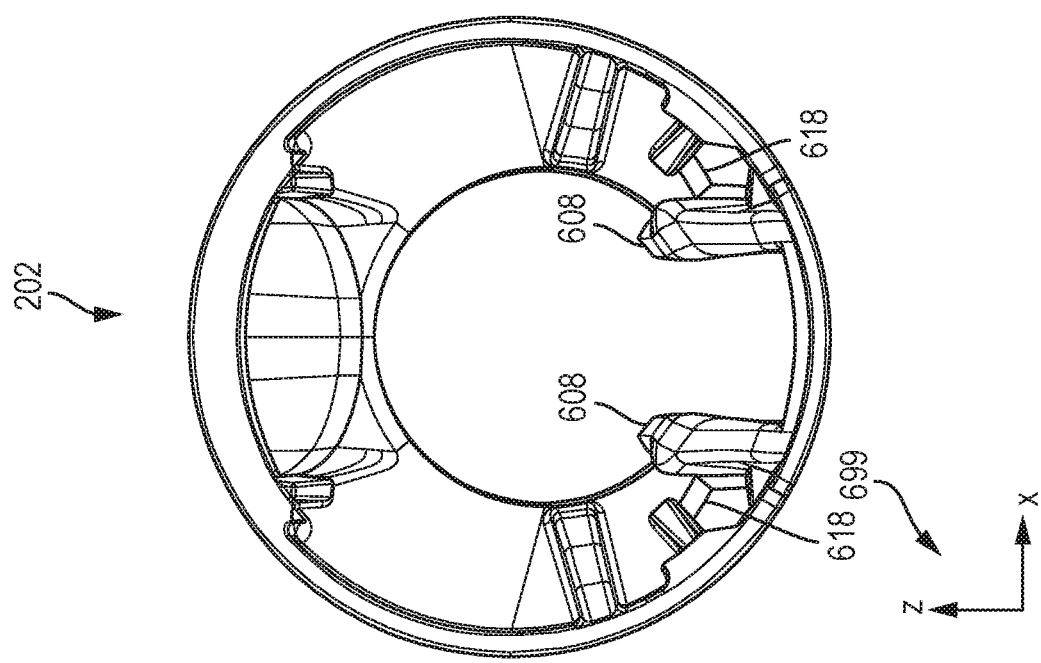
Figure 13:
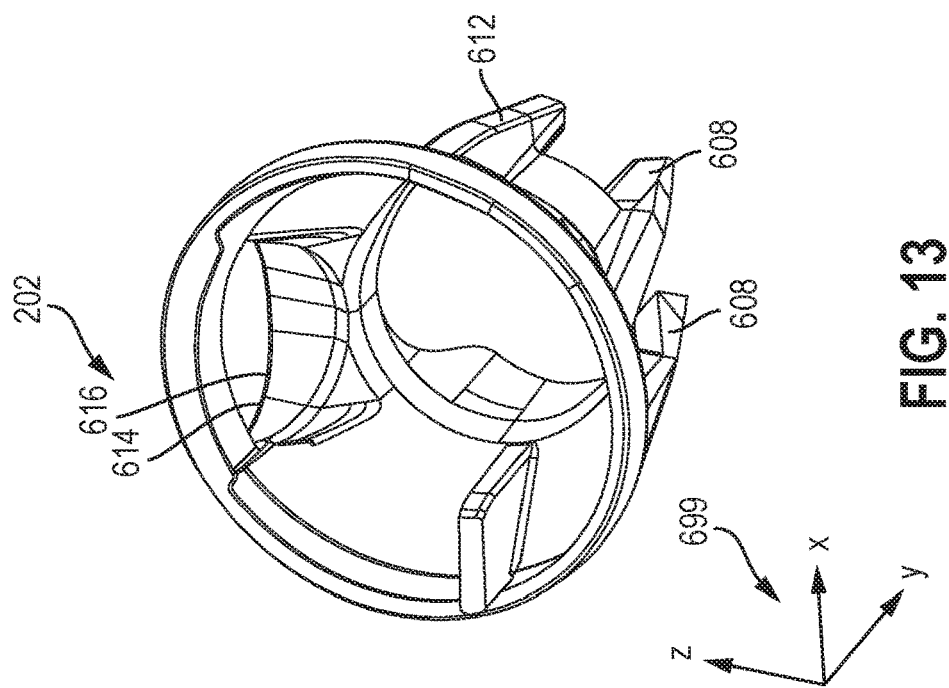
Figure 12:
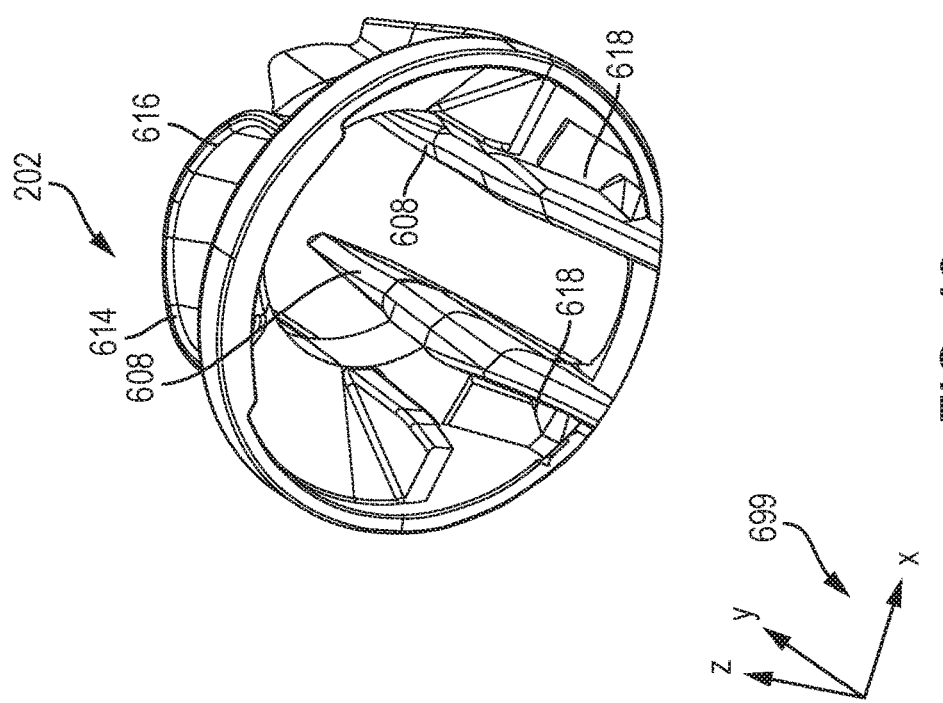
Figure 15:
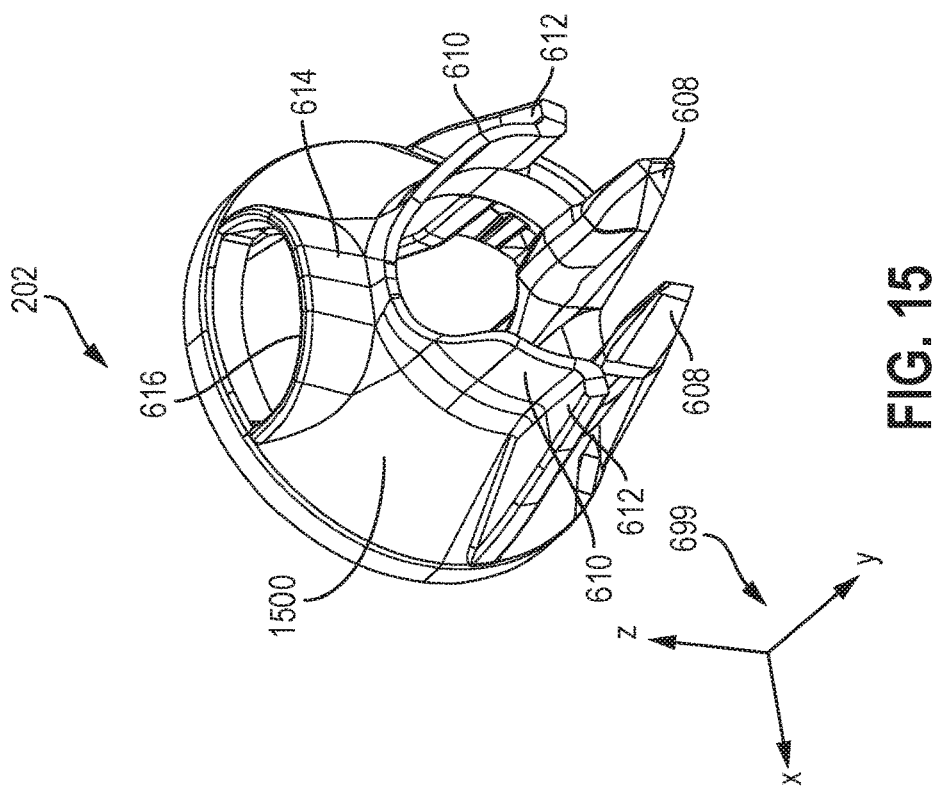
Figure 14:
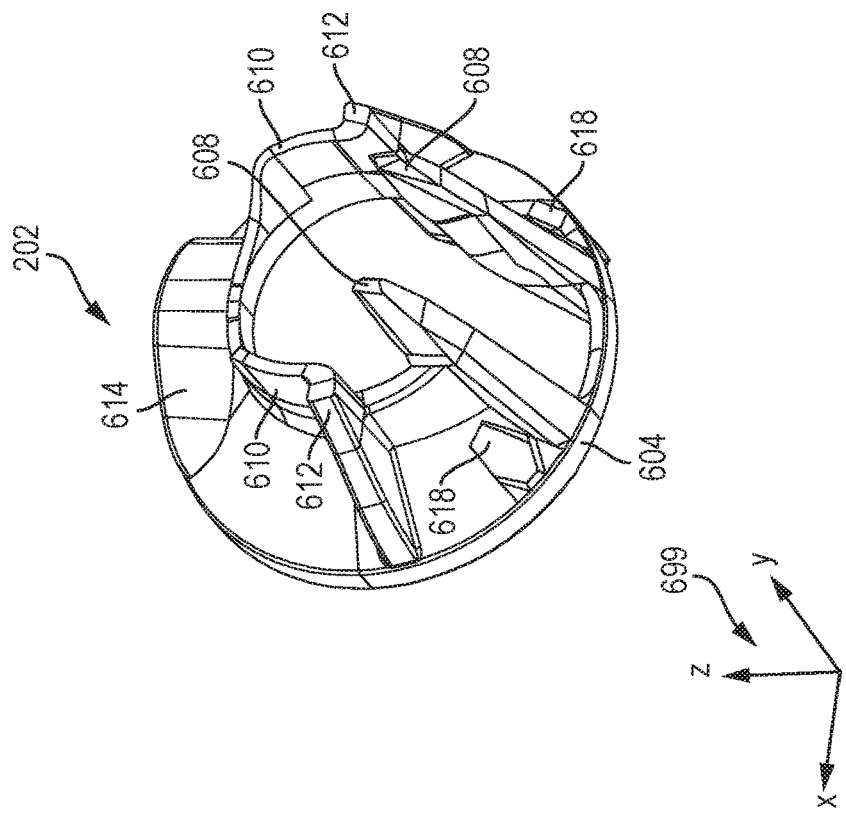
Figure 17:
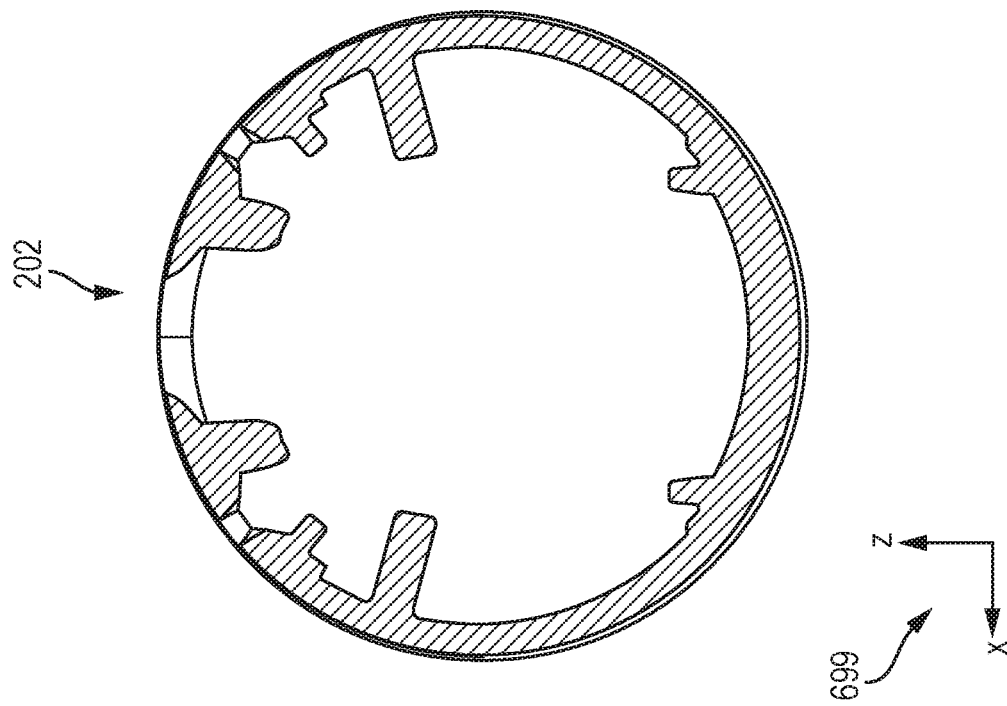
Figure 16:
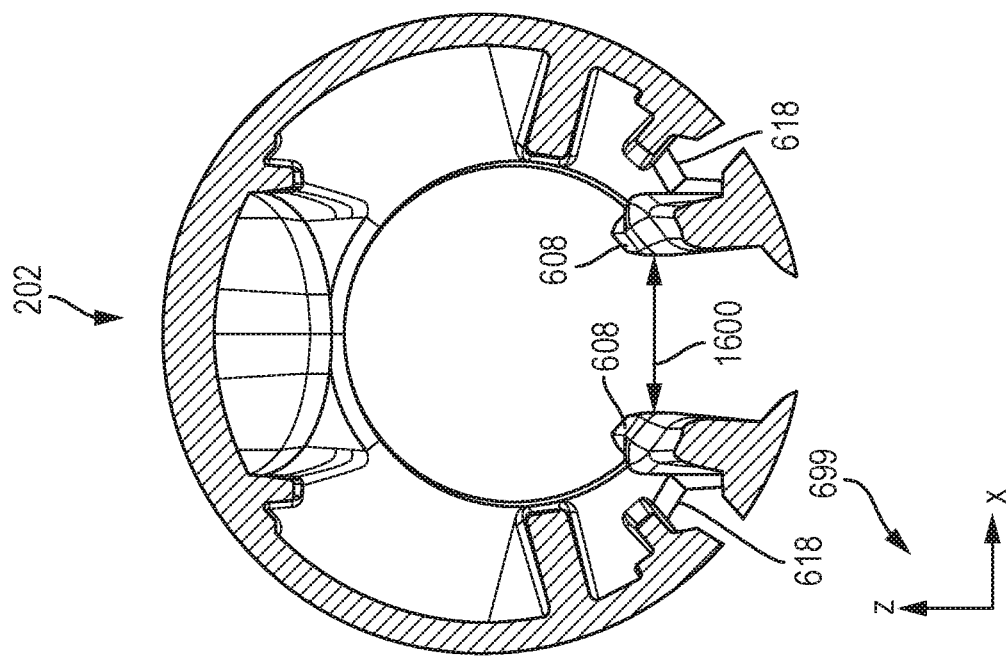
Figure 19:
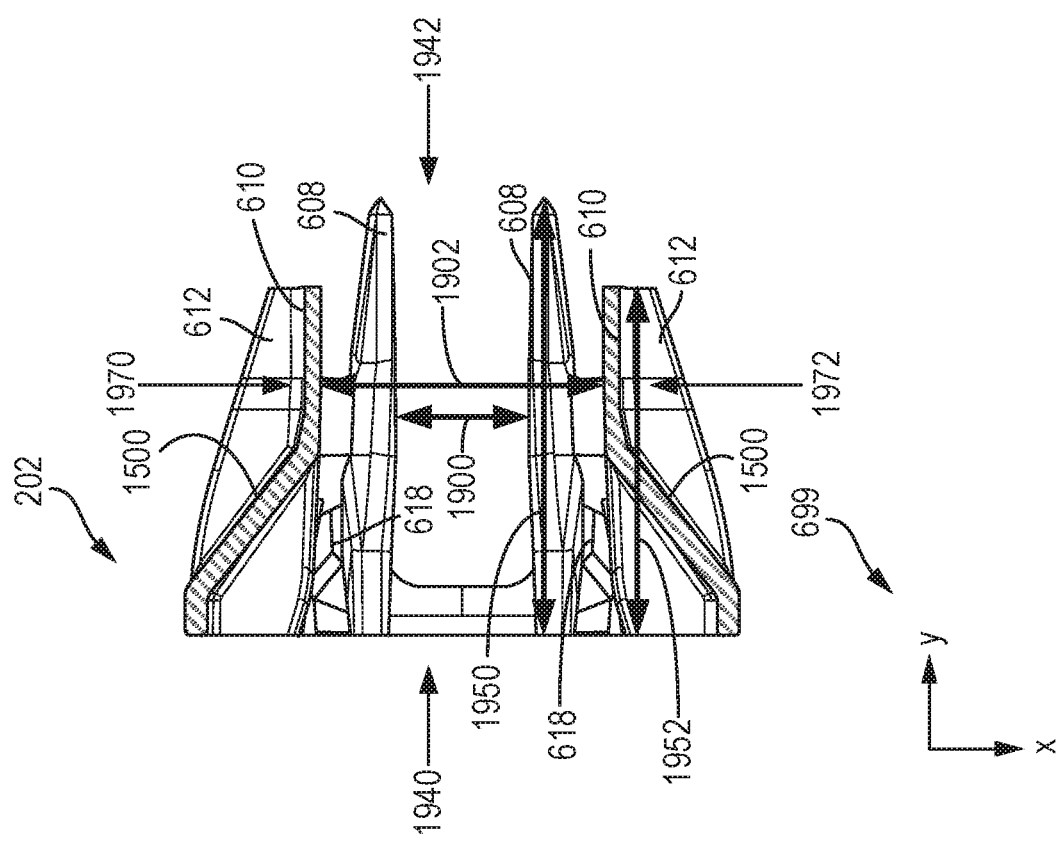
Figure 18:
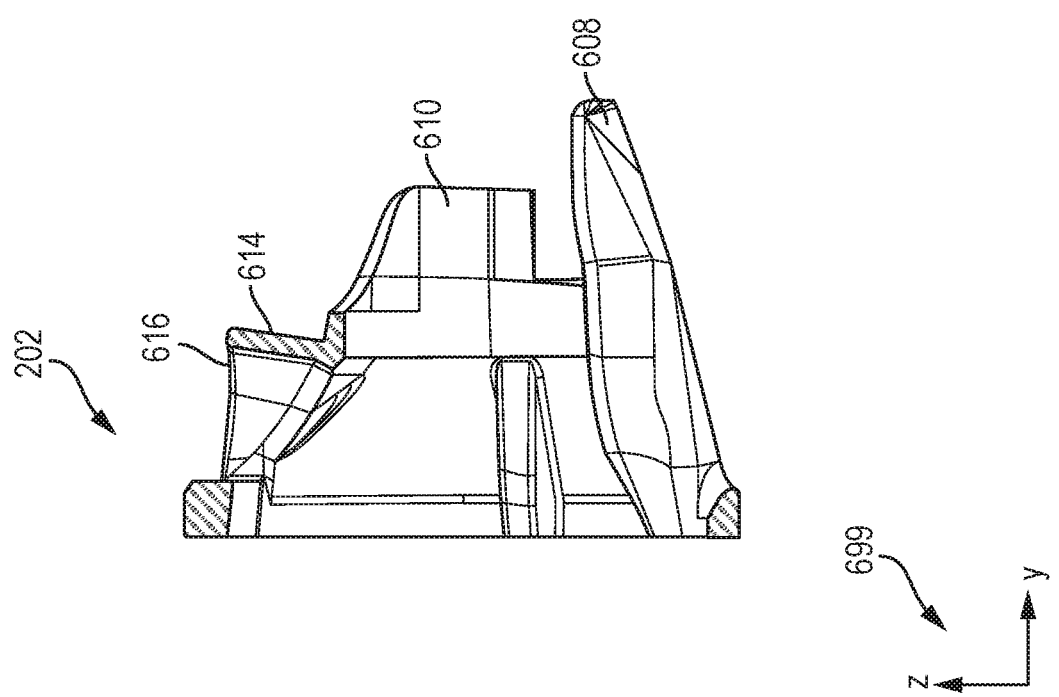

Turning now to FIGS. 6-19, various views of the nozzle guide 202 are shown, with the nozzle guide 202 removed from the refueling adapter 200. Specifically, FIGS. 6-7 each show side views of the nozzle guide 202, FIG. 8 shows a bottom view of the nozzle guide 202, FIG. 9 shows a top view of the nozzle guide 202. FIG. 10 shows a front view of the nozzle guide 202, FIG. 11 shows a back view of the nozzle guide 202, FIG. 12 shows a top-front perspective view of the nozzle guide 202, FIG. 13 shows a bottom-front perspective view of the nozzle guide 202, FIG. 14 shows a bottom-back perspective view of the nozzle guide 202. FIG. 15 shows a top-back perspective view of the nozzle guide 202. FIG. 16 shows a cross-sectional view of the nozzle guide 202 along axis 650 shown by FIG. 6, FIG. 17 shows a cross-sectional view of the nozzle guide 202 along axis 652 shown by FIG. 7, FIG. 18 shows a cross-sectional view of the nozzle guide 202 along axis 656 shown by FIG. 9, and FIG. 19 shows a cross-sectional view of the nozzle guide 202 along axis 654 shown by FIG. 7. Each of FIG. 6-19 include reference axes 699 for relative comparison of the views shown.

In order to couple the nozzle guide 202 to the refueling adapter 200 shown by FIGS. 2-5, the nozzle guide 202 may include a plurality of extensions (not shown) configured to fit into (e.g., mate with) counterpart slots of the refueling adapter 200. During conditions in which the nozzle guide 202 is pressed against the refueling adapter 200, the extensions may engage with the counterpart slots of the refueling adapter 200 in order to lock the nozzle guide 202 to the refueling adapter 200 without additional fasteners.

During conditions in which the nozzle guide 202 is coupled to the refueling adapter 200 as described above, features of the nozzle guide 202 may guide a fuel nozzle inserted into the refueling adapter 200 into a centered position within the refueling adapter 200 (e.g., as described above with reference to FIGS. 2-5). Further, features of the nozzle guide 202 may reduce a likelihood of inserting the fuel nozzle too far into the refueling adapter 200 by engaging with outer surfaces of the fuel nozzle in order to obstruct the fuel nozzle. For example, the nozzle guide 202 includes a plurality of protrusions 608 configured to guide the fuel nozzle toward the centered position and to reduce a likelihood that the fuel nozzle is inserted through the refueling adapter 200 to a position beyond the protrusions 608. In one example, each of the protrusions 608 is flexible and may deflect (e.g., bend) in an outward direction during conditions in which the fuel nozzle is inserted through the refueling adapter 200 and is engaged with the protrusions 608. Engaging the fuel nozzle with the protrusions 608 may include seating the fuel nozzle against each of the protrusions 608 and encircling a portion of the fuel nozzle with the protrusions 608. For example, each protrusion 608 may be positioned radially around the fuel nozzle in a radial direction of axis 206 during conditions in which the fuel nozzle is seated against the protrusions 608, with each protrusion 608 extending along a length of the fuel nozzle approximately parallel to axis 206.

As indicated by FIG. 8, during conditions in which the fuel nozzle is pressed against the protrusions 608 by inserting the fuel nozzle through the refueling adapter 200 and engaging the fuel nozzle with the protrusions 608, the protrusions 608 move in the outward direction indicated by arrows 800, away from the fuel nozzle and the axis of insertion of the fuel nozzle into the refueling adapter 200 (e.g., axis 206 shown by FIGS. 2-5). However, as the protrusions 608 move in the outward direction, the protrusions 608 press against the fuel nozzle in an inward direction opposite to the outward direction indicated by arrows 800, thereby obstructing the fuel nozzle and reducing a likelihood that the fuel nozzle will be inserted beyond the protrusions 608. An operator of the fuel nozzle may feel an increased amount of resistance to insertion of the fuel nozzle into the nozzle guide 202 as the fuel nozzle presses against the protrusions 608 and deflects the protrusions in the outward direction, enabling the operator to sense how far the fuel nozzle has been inserted into the nozzle guide 202 and refueling adapter 200. In this configuration, the protrusions 608 are adapted to resist insertion of the fuel nozzle through the refueling adapter 200 to a position beyond the nozzle guide 202. Further, a space between the protrusions 608 as indicated by arrow 1600 of FIG. 16 enables fuel to be guided by the nozzle guide 202 toward the fuel line fluidly coupling the refueling adapter 200 and nozzle guide 202 to the fuel tank of the vehicle (e.g., fuel line 11 shown by FIG. 1 and described above). The protrusions 608 may enclose the shut-off aspirator of the fuel nozzle, with the shut-off aspirator being disposed within the space indicated by arrow 1600.

The nozzle guide 202 further includes a plurality of additional features (e.g., in addition to protrusions 608) configured to center the fuel nozzle within the nozzle guide. For example, the nozzle guide 202 may include one or more centering features (e.g., arms) extending in a direction of the refueling adapter 200 during conditions in which the nozzle guide 202 is coupled to the refueling adapter 200 (e.g., in a direction away from the direction of extension of the protrusions 608 and toward the first pivotable door 210 shown by FIG. 2 and described above). Each of the centering features may additionally extend in a direction toward the axis 206 on which the fuel nozzle is centered. The centering features may be positioned opposite to each other relative to axis 206 (e.g., opposite to each other across axis 206). During conditions in which the fuel nozzle is inserted into the nozzle guide 202, the fuel nozzle may press against the centering features and may be guided into the centered position by the arms. In one example, the centering features may be shaped to be more rigid (e.g., have a greater stiffness) than the protrusions 608, such that the centering features do not deflect as much as the protrusions 608 while the fuel nozzle is pressed against the centering features (e.g., relative to conditions in which the protrusions 608 deflect as the fuel nozzle is pressed against the protrusions 608).

In order to further provide centering of the fuel nozzle within the nozzle guide 202 (e.g., centering of the fuel nozzle along axis 206 shown by FIGS. 2-5), the nozzle guide 202 may include a lower ramped portion (not shown) joined to the protrusions 608. The lower ramped portion may extend in the direction toward the refueling adapter 200. During conditions in which the fuel nozzle is inserted through the refueling adapter 200 and into the nozzle guide 202, the lower ramped portion may support the fuel nozzle in the centered position (e.g., maintain the fuel nozzle in the centered position). Additionally, the lower ramped portion may guide the fuel nozzle toward the protrusions 608 in order to engage the fuel nozzle with the protrusions 608 as described above.

The nozzle guide includes a plurality of openings 618 (e.g., apertures) positioned at a lower end of the nozzle guide 202, which may be proximate to the lower ramped portion. The openings 618 may increase an amount of open space surrounding the fuel nozzle during conditions in which the fuel nozzle is centered within the nozzle guide 202, reducing a likelihood of pre-mature fuel nozzle shut-off resulting from obstruction of the shut-off aspirator of the fuel nozzle. Additionally, the openings 618 may increase a flow path of fuel (e.g., fuel vapor) through the nozzle guide 202, reducing a likelihood of backflow against the outer surfaces of the fuel nozzle. For example, the openings 618 may reduce an accumulation of fuel within the nozzle guide 202 and may enable fuel within the nozzle guide 202 to drain into the fuel line fluidly coupling the nozzle guide 202 to the fuel tank as described above. Further, fuel vapor may flow through the openings 618 in order to reduce an amount of fuel vapor pressure within the nozzle guide 202.

The nozzle guide 202 additionally includes a plurality of features configured to guide a flow of fuel vapor recirculating to the refueling adapter 200 and the nozzle guide 202 from the fuel tank of the vehicle. For example, the filler neck in which the refueling adapter 200 is disposed may include a recirculation passage configured to enable fuel vapor from the fuel tank to flow (e.g., vent) to the refueling adapter 200. A portion of the fuel vapor flowing from the fuel tank to the refueling adapter 200 and the nozzle guide 202 may be directed back to the fuel tank by features of the nozzle guide 202. In the example shown by FIGS. 6-19, the nozzle guide 202 includes an upper wall 614 forming an opening 616. Fuel vapor may flow from the recirculation passage into the nozzle guide 202 via the opening 616 formed by the upper wall 614, and may flow back into the fuel tank via the fuel line (e.g., may be guided to the fuel line by the upper wall 614). The upper wall 614 extends in a radial direction away from the axis along which the fuel nozzle is centered (e.g., axis 206 shown by FIGS. 2-5 and described above, and away from ramped portion 604). Fuel vapor flowing from the fuel tank to the nozzle guide 202 may be further guided back toward the fuel tank by a rear guard 610 including a plurality of rear arms 612 positioned at the back of the nozzle guide 202, proximate to the protrusions 608. During conditions in which the fuel nozzle is inserted into the nozzle guide 202 and is engaged with the protrusions 608, the rear guard 610 is positioned at an opposite side of the fuel nozzle relative to the protrusions 608 (e.g., such that the fuel nozzle is surrounded by the rear guard 610, the rear arms 612, and the protrusions 608) and downstream of the upper wall 614 (e.g., relative to the direction in which the fuel nozzle is inserted into the nozzle guide 202 and the direction of fuel flow from the fuel nozzle). In some examples, fuel vapor may flow around (e.g., along) the upper wall 614, rear arms 612, and rear guard 610 in a different way than described above. Some examples of fuel vapor flow around a similar nozzle guide (e.g., similar to nozzle guide 202) are shown by FIGS. 39-42 and described further below. By guiding the flow of fuel vapor via the upper wall 614, rear arms 612, and rear guard 610, an amount of fuel vapor flowing out of the refueling adapter 200 to atmosphere may be reduced. Further, in some examples, an amount of mixing of the fuel vapor with liquid fuel may be reduced. In some examples, a stiffness of the rear guard 610 may be greater than a stiffness of each of the protrusions 608. For example, during conditions in which the fuel nozzle is inserted into the nozzle guide 202, an insertion force of the fuel nozzle (e.g., a force with which the fuel nozzle is inserted into the nozzle guide 202) may temporarily bend the protrusions 608 but may not bend the rear guard 610. As one example, the insertion force may be approximately 20 newtons.

As shown by FIG. 19, the rear guard 610 includes a first side 1970 and a second, opposing side 1972, and a length 1902 between the first side 1970 and the second side 1972 in a radial direction of the nozzle guide 202 (e.g., a radial direction relative to an axis on which the fuel nozzle is centered during conditions in which the fuel nozzle is inserted into the nozzle guide 202) is greater than a length 1900 of the space between the protrusions 608 in the radial direction. Further, a length 1952 of the rear guard 610 in an axial direction of the nozzle guide 202 (e.g., a direction parallel to the axis on which the fuel nozzle is centered during conditions in which the fuel nozzle is inserted into the nozzle guide 202) is less than a length 1950 of the plurality of protrusions 608 in the axial direction. An outer surface 1500 of the nozzle guide 202 tapers inward toward the rear guard 610 from a first end 1940 of the nozzle guide 202 toward a second end 1942 of the nozzle guide 202, with the plurality of protrusions 608 extending from the second end 1942. The protrusions 608 are positioned at a same end (e.g., the second end 1942) as the rear guard 610 (e.g., rear guard 610 is positioned closer to second end 1942 than first end 1940).

The nozzle guide 202 funnels the fuel flow into the fill pipe while reducing hydrodynamic losses and reducing a likelihood of pre-mature nozzle shut-off. For example, the nozzle shut-off aspirator is positioned in the nozzle guide 202 such that backflow does not come into contact with the aspirator. Centering the fuel nozzle in the nozzle guide 202 enables the aspirator to only shut off the fuel nozzle once refueling has completed (e.g., the fuel tank has filled to the desired level).

Figure 21:
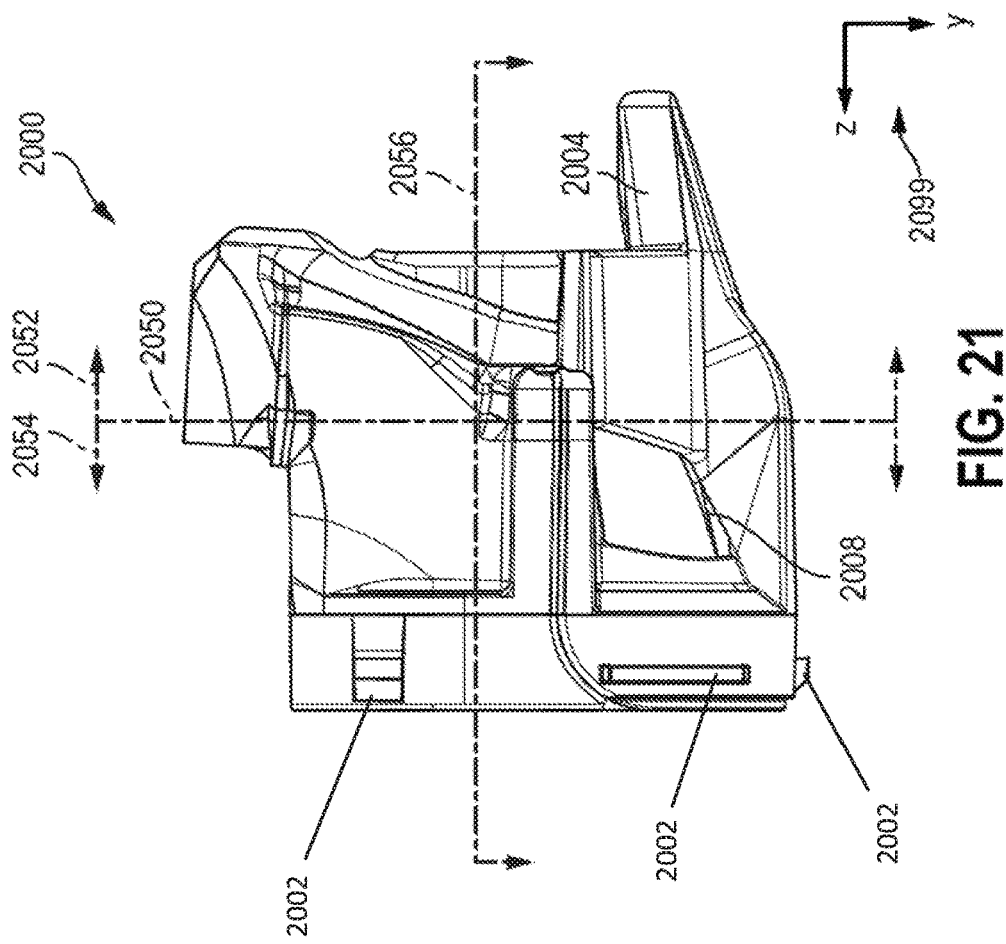
FIGS. 20-33 show different side, cross-sectional, and perspective views of a second nozzle guide for a refueling adapter.
Figure 20:
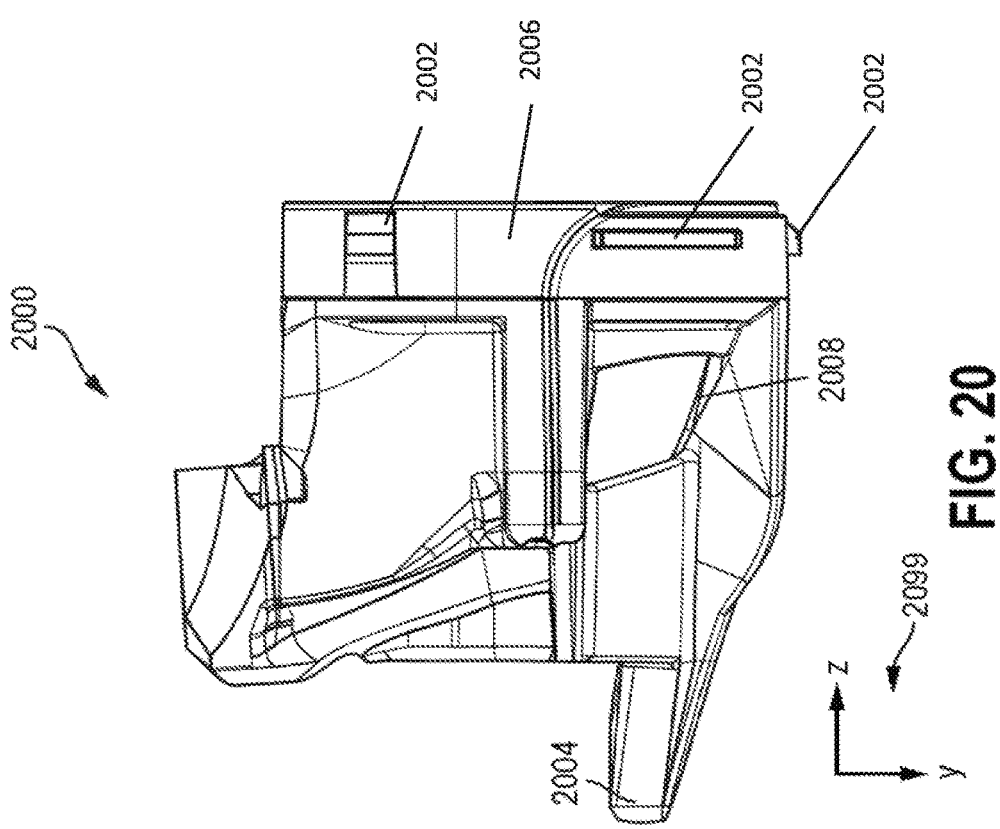

Turning now to FIGS. 20-21, a second example of a nozzle guide 2000 (which may be referred to herein as a flow guide and/or nozzle flow guide) is shown. Nozzle guide 2000 may include some features similar to the nozzle guide 202 described above with reference to FIGS. 2-19. Further, nozzle guide 2000 may be adapted to couple to a refueling adapter, similar to the refueling adapter 200 shown by FIGS. 2-5. In some examples, each of the nozzle guide 202 and the nozzle guide 2000 may be adapted to couple to refueling adapters configured for a same fuel type (e.g., diesel fuel, gasoline, etc.). In other examples, each of nozzle guide 202 and nozzle guide 2000 may be adapted to couple to refueling adapters configured to receive a variety of different fuel nozzles (e.g., fuel nozzles having different shapes, lengths, diameters, etc.). In yet other examples, nozzle guide 202 may be adapted to couple to refueling adapters configured to receive fuel nozzles dispensing a first fuel (e.g., diesel fuel), and nozzle guide 2000 may be adapted to couple to refueling adapters configured to receive fuel nozzles dispensing a different, second fuel (e.g., gasoline). However, in each example, similar features of the nozzle guide 2000 relative to the nozzle guide 202 may perform a similar function, as described below. In some examples, the nozzle guide 2000 may be similar to the nozzle guide 51 shown by FIG. 1 and described above.

Figure 23:
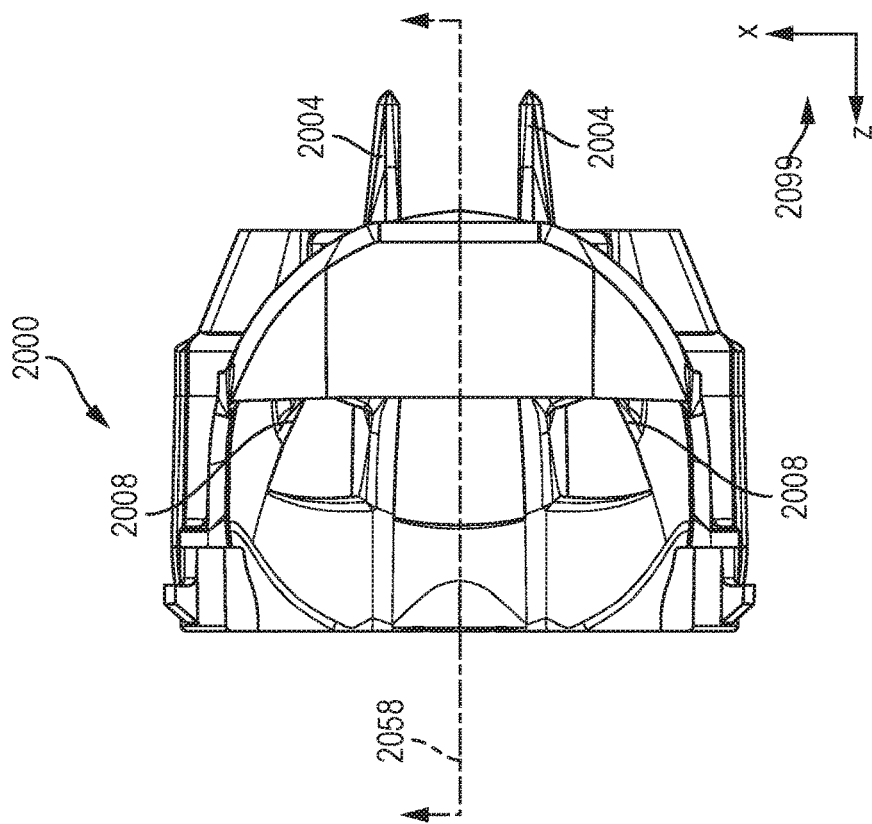
Figure 22:
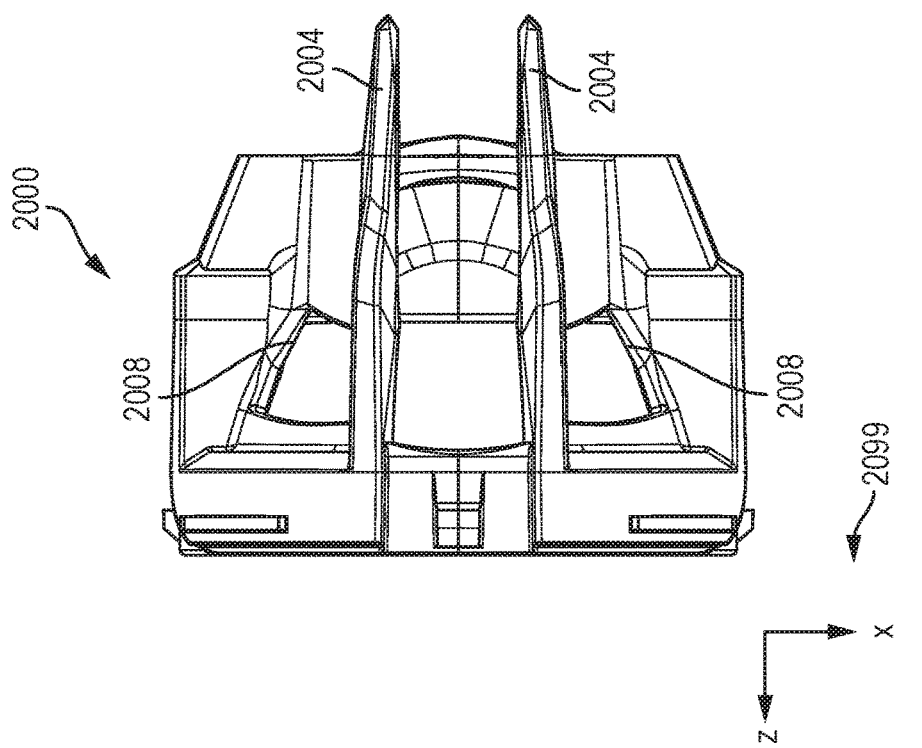
Figure 25:
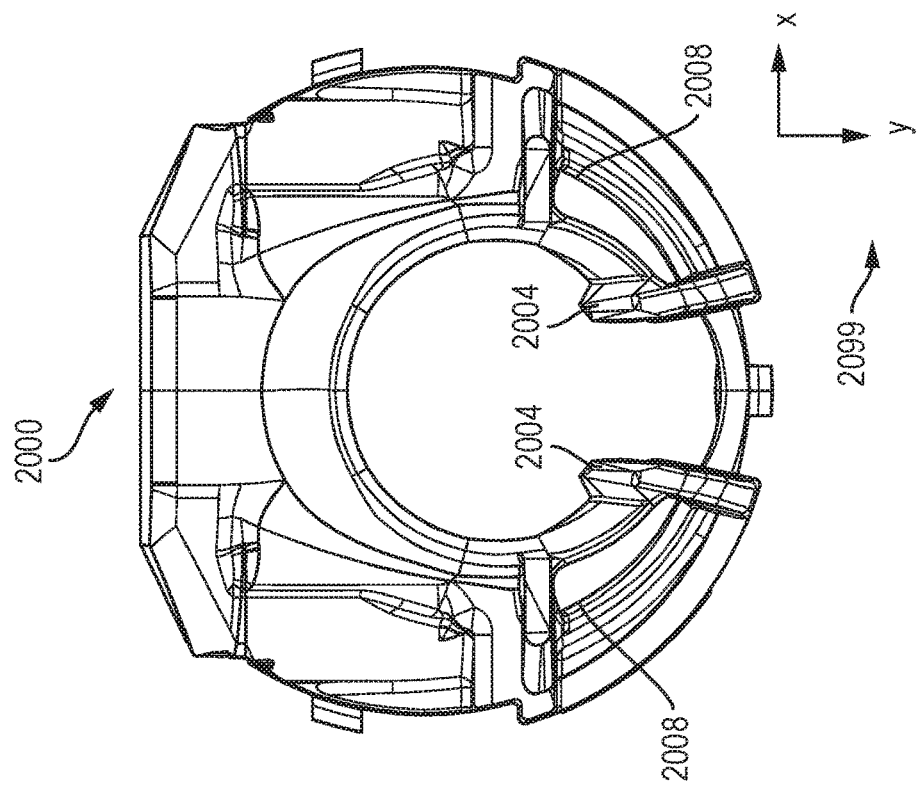
Figure 24:
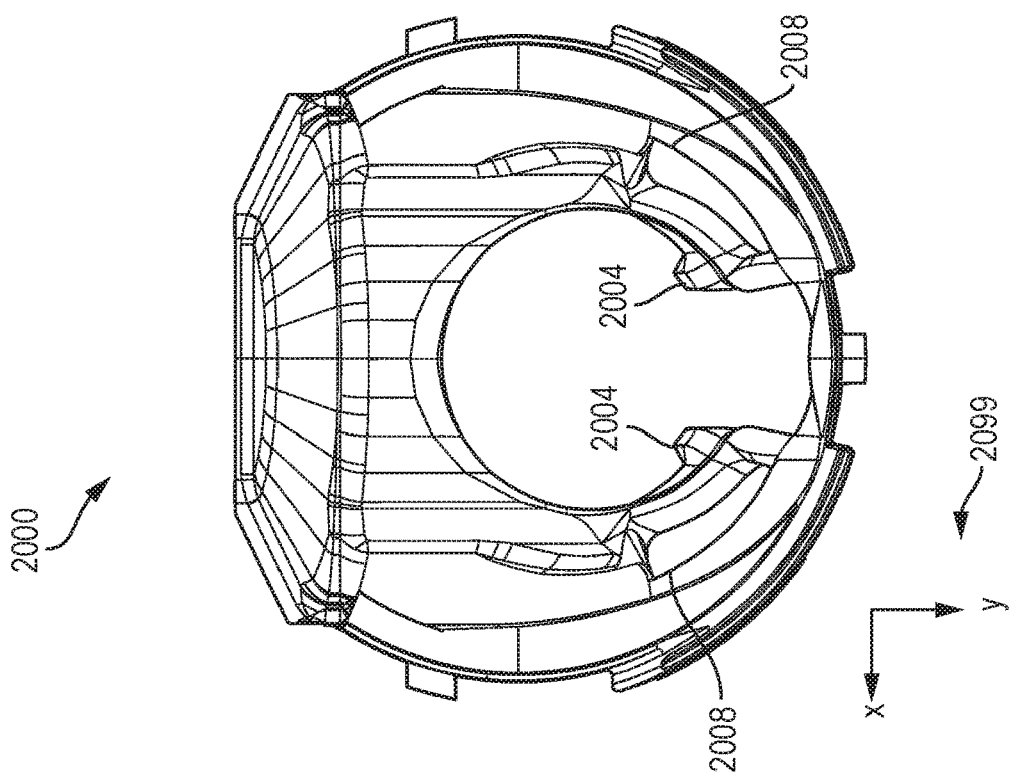
Figure 27:
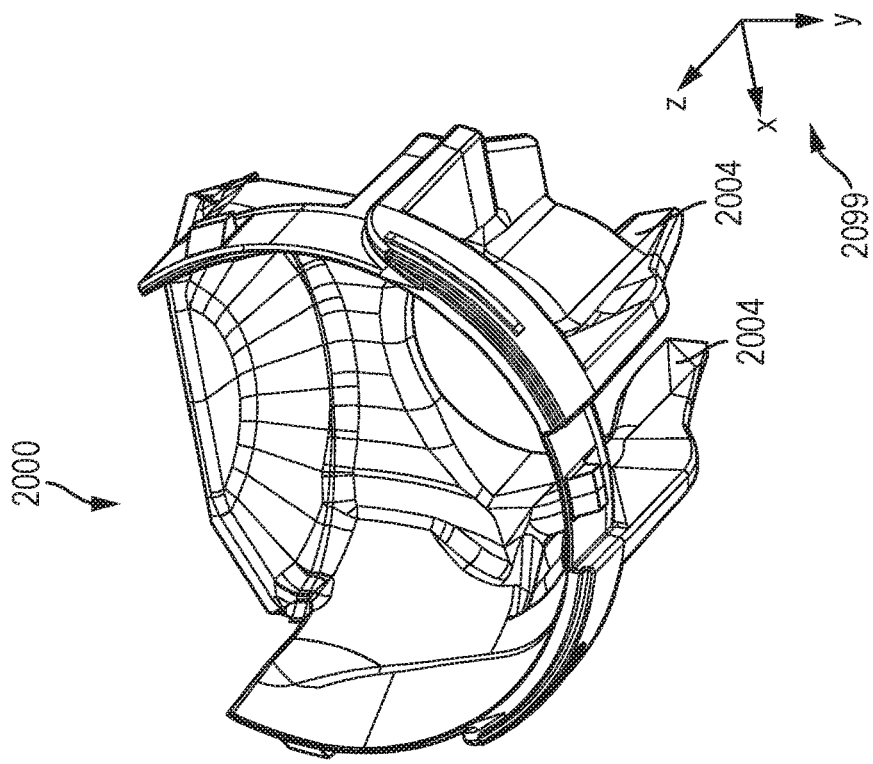
Figure 26:
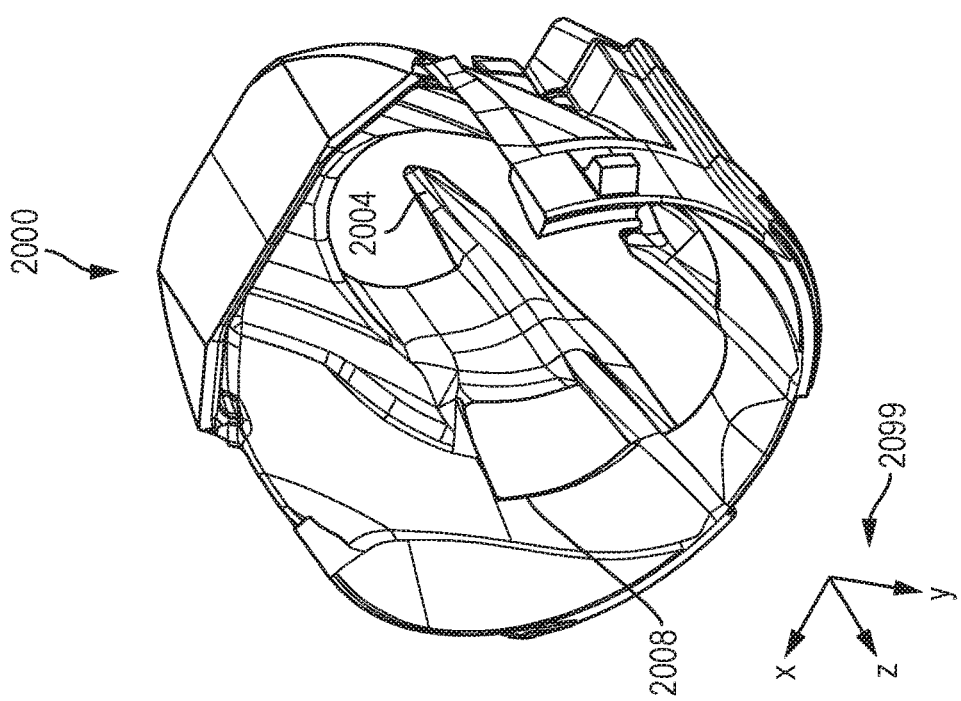
Figure 29:
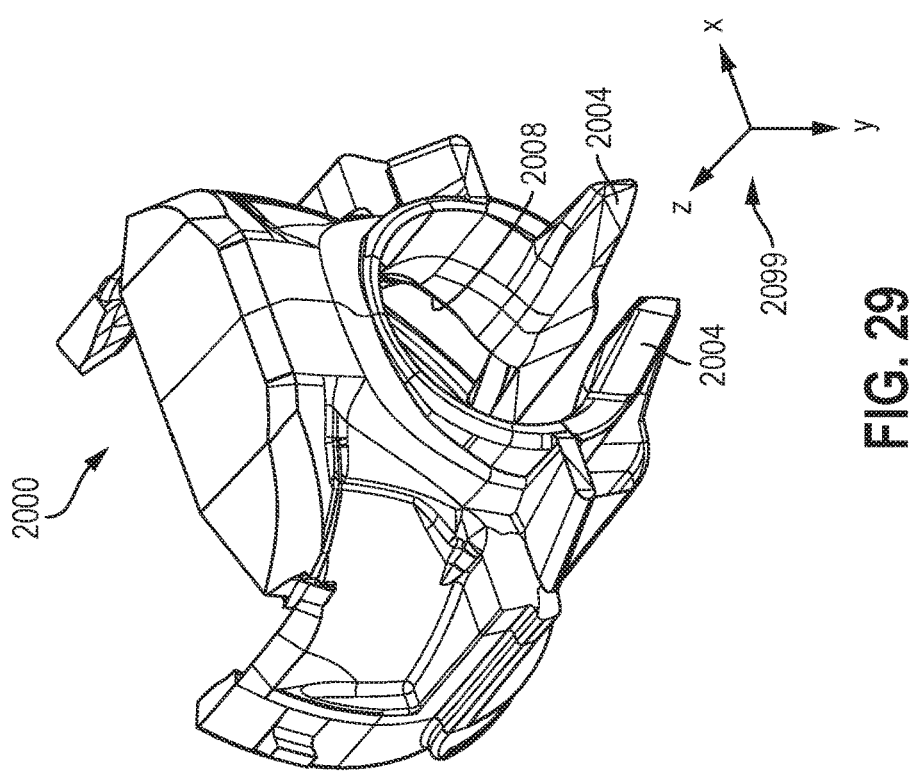
Figure 28:
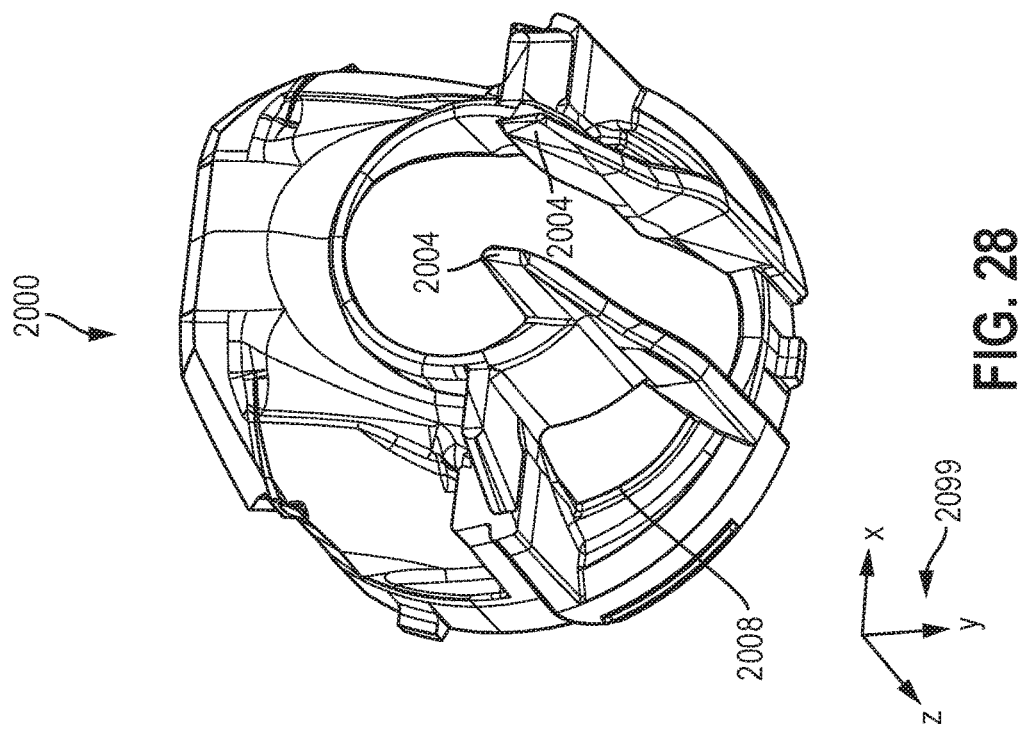
Figure 31:
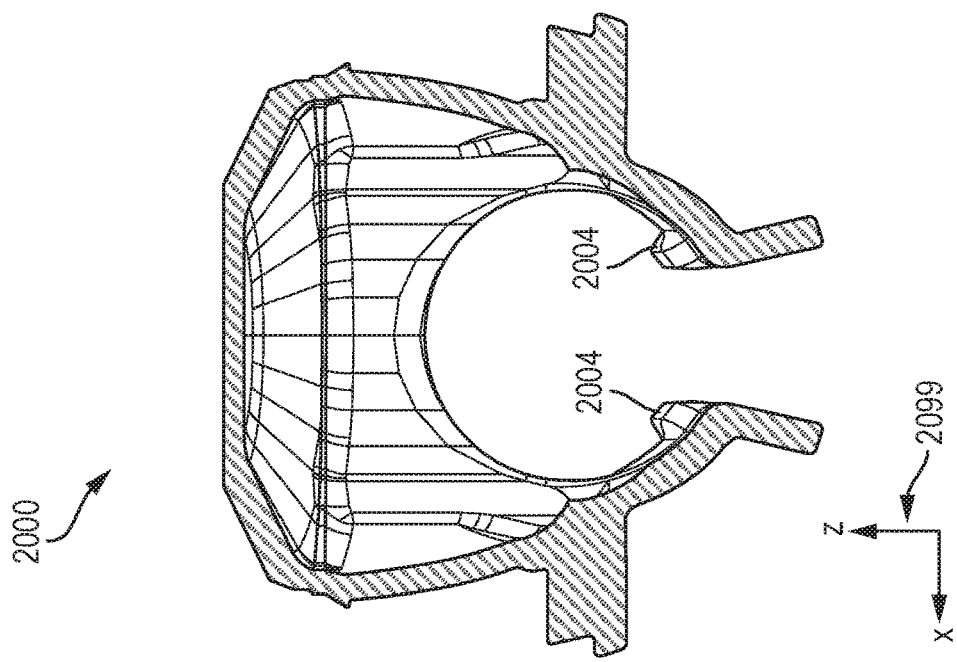
Figure 30:
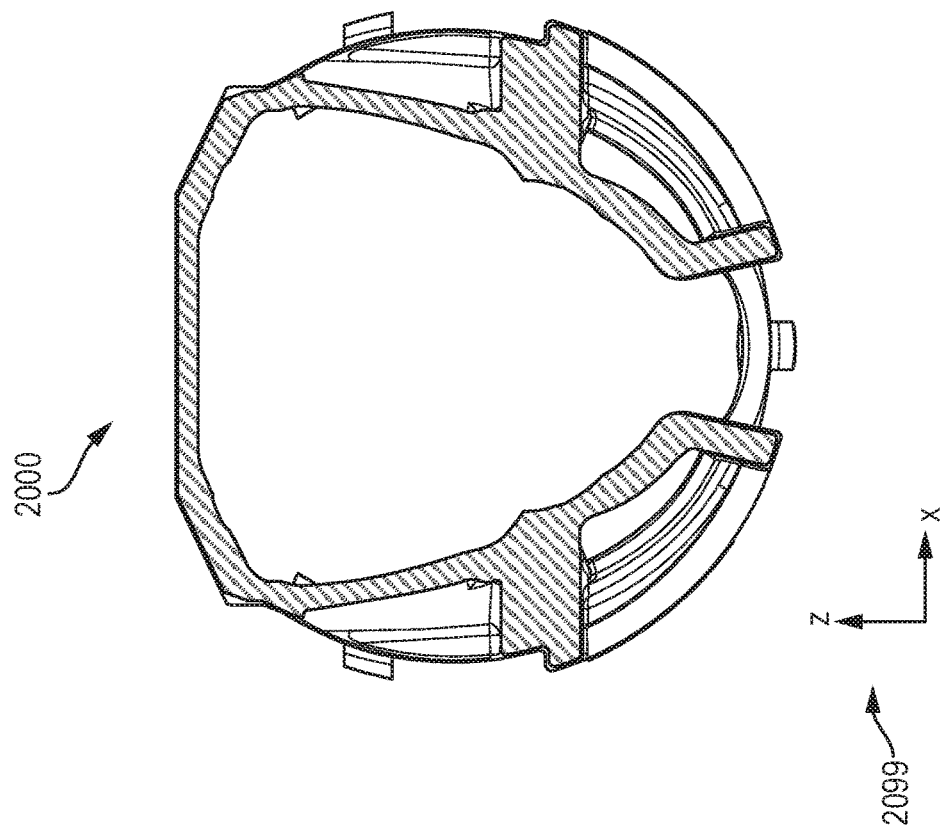
Figure 33:
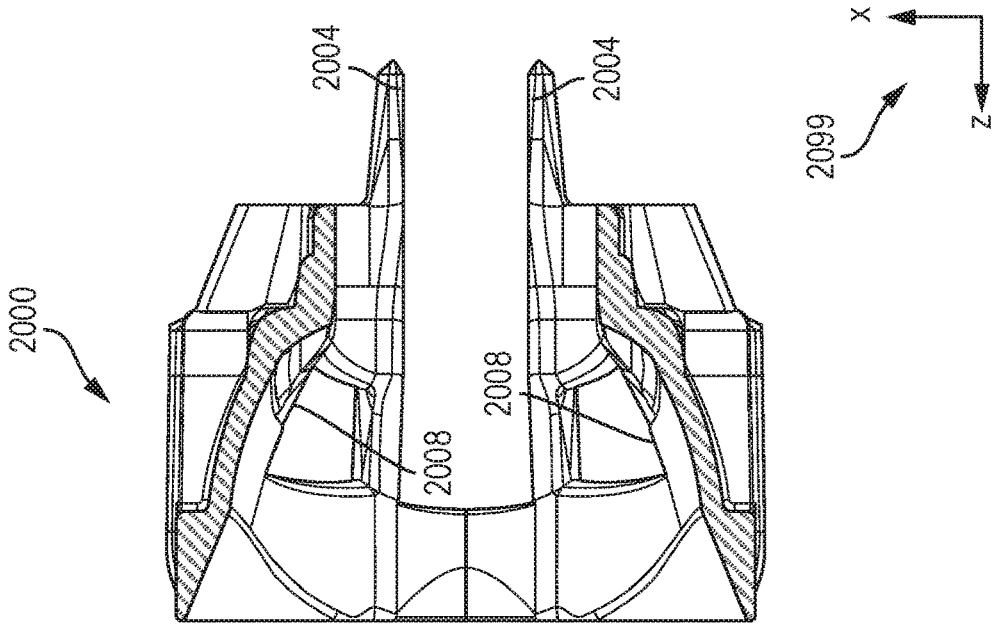
Figure 32:
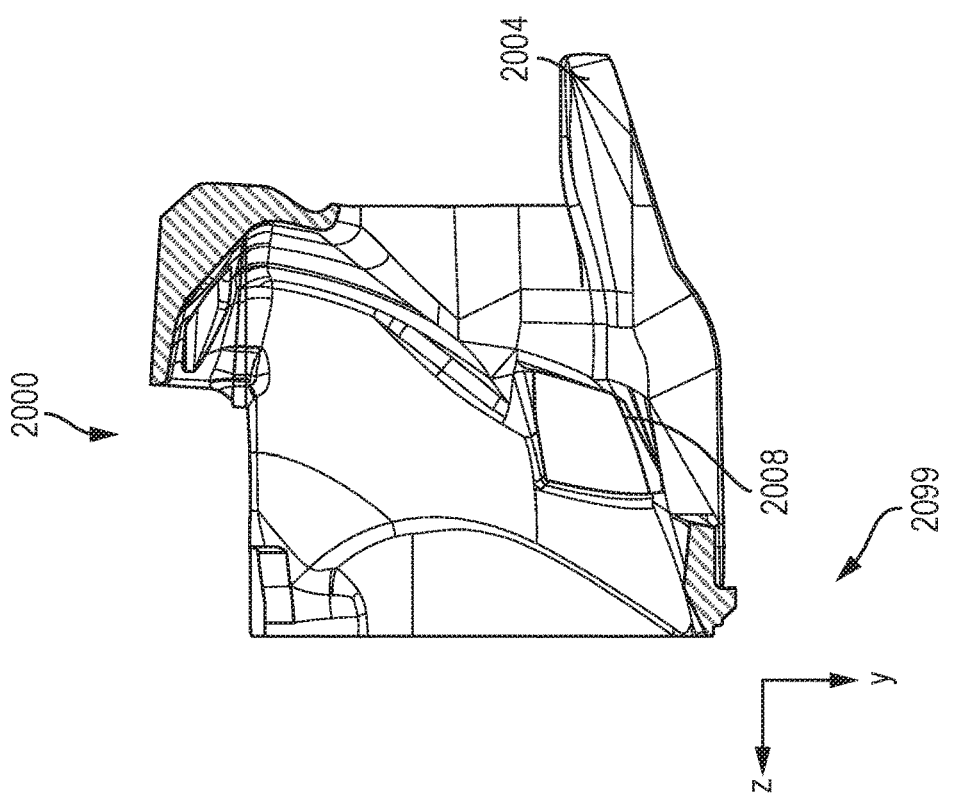

The FIGS. 20-33 each show the nozzle guide 2000 separated from its corresponding refueling adapter (e.g., refueling adapter 200 shown by FIGS. 2-5 and described above). Specifically, FIGS. 20-21 show side views of the nozzle guide 2000. FIG. 22 shows a bottom view of the nozzle guide 2000, FIG. 23 shows a top view of the nozzle guide 2000, FIG. 24 shows a front view of the nozzle guide 2000. FIG. 25 shows a back view of the nozzle guide 2000. FIG. 26 shows a top-front perspective view of the nozzle guide 2000, FIG. 27 shows a bottom-front perspective view of the nozzle guide 2000, FIG. 28 shows a bottom-back view of the nozzle guide 2000, FIG. 29 shows a top-back view of the nozzle guide 2000, FIG. 30 shows a cross-sectional view of the nozzle guide 2000 along axis 2050 shown by FIG. 21 in direction 2054, FIG. 31 shows a cross-sectional view of the nozzle guide 2000 along axis 2050 shown by FIG. 21 in direction 2052, FIG. 32 shows a cross-sectional view of the nozzle guide 2000 along axis 2058 shown by FIG. 23, and FIG. 33 shows a cross-sectional view of the nozzle guide 2000 along axis 2056 shown by FIG. 21. Reference axes 2099 are included by each of FIGS. 20-33 for relative comparison of the views shown.

FIGS. 20 and 21 depict a plurality of coupling features 2002 positioned on a base portion 2006 of the nozzle guide 2000 which couples to a refueling adapter 200. The coupling features 2002 may be formed as protrusions or slots which fit with corresponding protrusions or slots on a refueling adapter 200.

The nozzle guide 2000 may include a plurality of extensions (not shown) configured to enable the nozzle guide 2000 to couple to a refueling adapter (e.g., refueling adapter 200 shown by FIGS. 2-5 and described above). For example, the extensions (which may be referred to herein as coupling features) may be shaped to couple the nozzle guide 2000 in locking engagement with the refueling adapter. The refueling adapter may include a plurality of counterpart coupling features (e.g., counterpart slots) configured to receive the extensions.

Nozzle guide 2000 further includes a plurality of protrusions 2004 configured to guide the fuel nozzle inserted into the nozzle guide 2000. In some examples, the protrusions 2004 may deflect (e.g., bend) in an outward direction while the fuel nozzle is pressed against the protrusions 2004, similar to the example of the protrusions 608 described above with reference to nozzle guide 202. The protrusions 2004 may guide the fuel nozzle toward a centered position within the nozzle guide 2000 and the corresponding coupled refueling adapter.

A plurality of openings 2008 are positioned at a bottom end of the nozzle guide 2000 and may reduce an amount of fuel accumulation within the nozzle guide 2000, similar to the openings 618 described above with reference to nozzle guide 202. Further, the openings 2008 may enable fuel vapor to flow through the nozzle guide 2000, reducing an amount of fuel vapor pressure within the nozzle guide 2000.

The nozzle guide 2000 may include a plurality of recesses (not shown) formed by interior surfaces of the nozzle guide 2000, with the plurality of recesses being positioned at a top end of the nozzle guide 2000, opposite to the protrusions 2004 (e.g., at an opposite side of the fuel nozzle relative to the protrusions 2004 during conditions in which the fuel nozzle is inserted into the nozzle guide 2000). In some examples, the recesses may alter the flow of fuel vapor and/or liquid fuel through the nozzle guide 2000. In other examples, the recesses may aid in coupling the nozzle guide 2000 to the corresponding refueling adapter (e.g., aligning the nozzle guide 2000 with the refueling adapter). In some examples, the nozzle guide 2000 may additionally include a plurality of slots (not shown) positioned at an exterior of the nozzle guide 2000, with the slots configured to alter the flow of fuel vapor and/or liquid fuel through the nozzle guide 2000, and/or to aid in coupling the nozzle guide 2000 to the corresponding refueling adapter.

Turning next to FIGS. 34-37, various views are shown illustrating a refueling adapter 3400 coupled with different fuel nozzles. In some examples, the refueling adapter 3400 may be similar to the refueling adapter 49 shown by FIG. 1 and described above, and/or the refueling adapter 200 shown by FIGS. 2-5 and described above. The refueling adapter 3400 is shown coupled to a first nozzle guide 3402 in FIG. 34, FIG. 36, and FIG. 38, and the refueling adapter 3400 is shown coupled to a second nozzle guide 3404 in FIG. 35 and FIG. 37. The first nozzle guide 3402 and/or second nozzle guide 3404 may each be referred to herein as a flow guide and/or nozzle flow guide. The first nozzle guide 3402 may be similar to nozzle guide 202 and/or nozzle guide 2000 in some examples. Similarly, the second nozzle guide 3404 may be similar to nozzle guide 202 and/or nozzle guide 2000 in some examples. Second nozzle guide 3404 may additionally include a funnel portion 3420 for guiding fuel flowing from the fuel nozzle toward a fuel tank of a vehicle (e.g., via fuel line 3422 joined to filler neck 3424, similar to fuel line 11 and filler neck 53 shown by FIG. 1 and described above). Filler neck 3424 includes a recirculation passage 3426, similar to the recirculation passage of the filler neck including the refueling adapter 200 as described above.

A first fuel nozzle 3408 is shown by FIGS. 34-35, a second fuel nozzle 3410 is shown by FIGS. 36-37, and a third fuel nozzle 3412 is shown by FIG. 38. The first fuel nozzle 3408 and second fuel nozzle 3410 may each have a similar diameter (e.g., a same amount of opening), and third fuel nozzle 3412 may have a larger diameter that each of the first fuel nozzle 3408 and the second fuel nozzle 3410. In one example, the third fuel nozzle 3412 may be a high-flow diesel fuel nozzle. The first fuel nozzle 3408 is shown to have a greater length than the second fuel nozzle 3410. However, in each example, the fuel nozzles are centered within the refueling adapter 3400 in part due to features of the first nozzle guide 3402 and second nozzle guide 3404. For example, first nozzle guide 3402 and second nozzle guide 3404 may include a plurality of protrusions similar to protrusions 608 of nozzle guide 202 or protrusions 2004 of nozzle guide 2000, with the protrusions adapted to guide each fuel nozzle toward the centered position within the refueling adapter 3400 (e.g., similar to the centered position indicated by outline 204 shown by FIG. 2).

Figure 40:
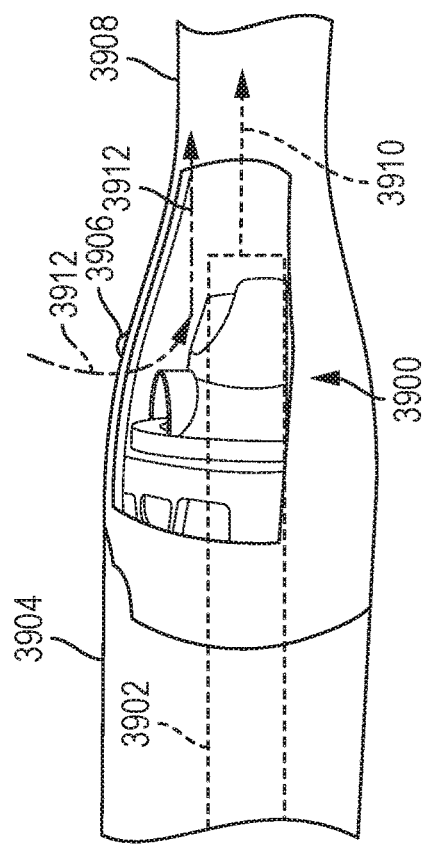
Figure 39:
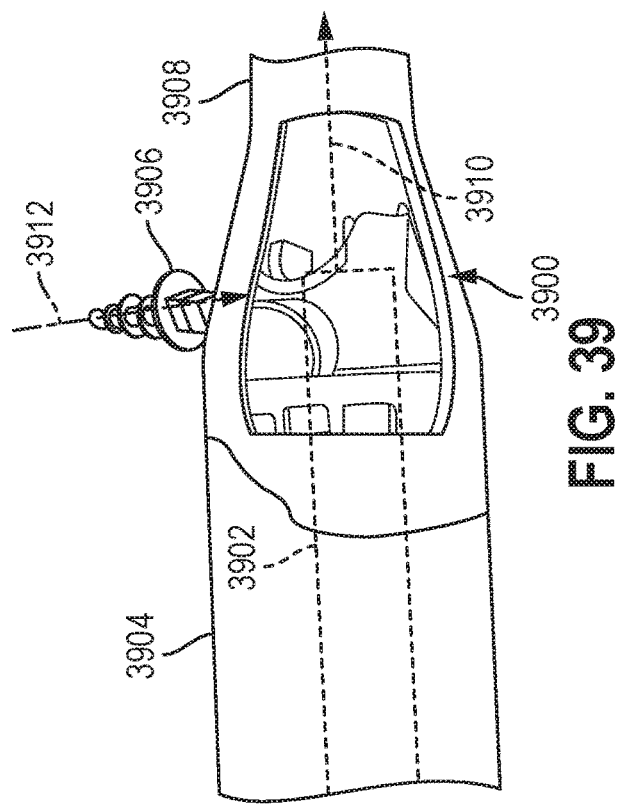

FIGS. 39-40 each show examples of a fuel guide 3900 (e.g., similar to nozzle guide 202, nozzle guide 2000, etc.) positioned within a filler neck 3904 (e.g., similar to filler neck 53). Further, 3902 indicates a position of a fuel nozzle within the fuel guide 3900 and its corresponding coupled refueling adapter (e.g., similar to refueling adapter 49, refueling adapter 200, etc.). Filler neck 3904 is joined to a fuel line 3908, similar to fuel line 11 shown by FIG. 1. Fuel flows from the fuel nozzle along flow path 3910, and fuel vapor may recirculate to the fuel guide 3900 via recirculation passage 3906. The flow of fuel vapor is indicated by arrows 3912.

Figure 42:
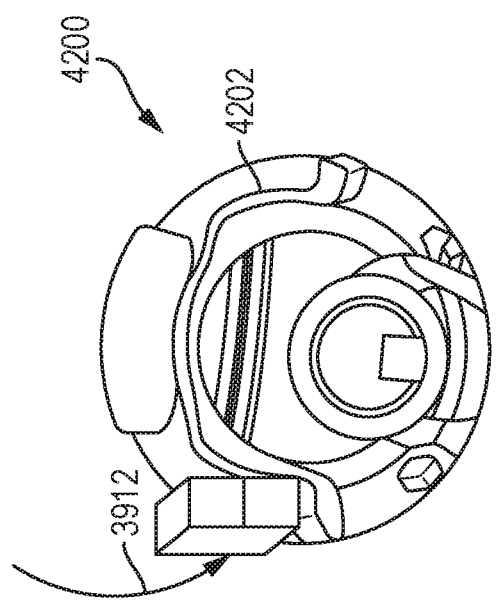
Figure 41:
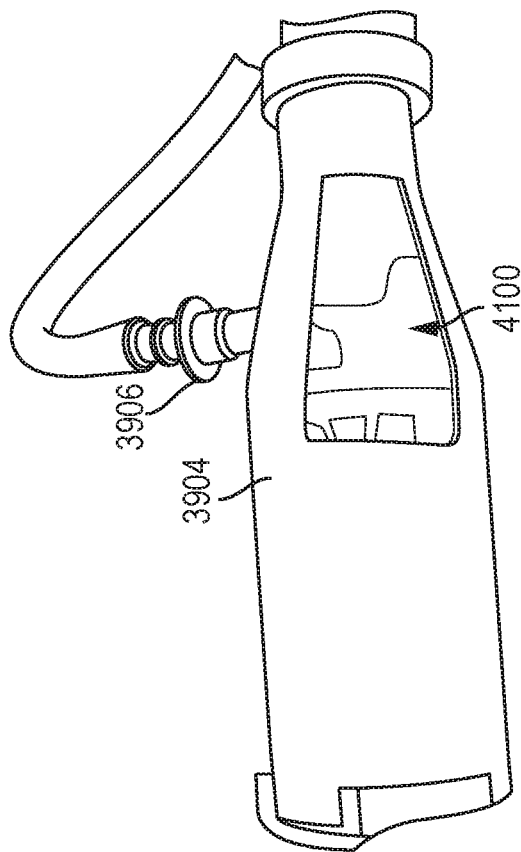
Figure 44:
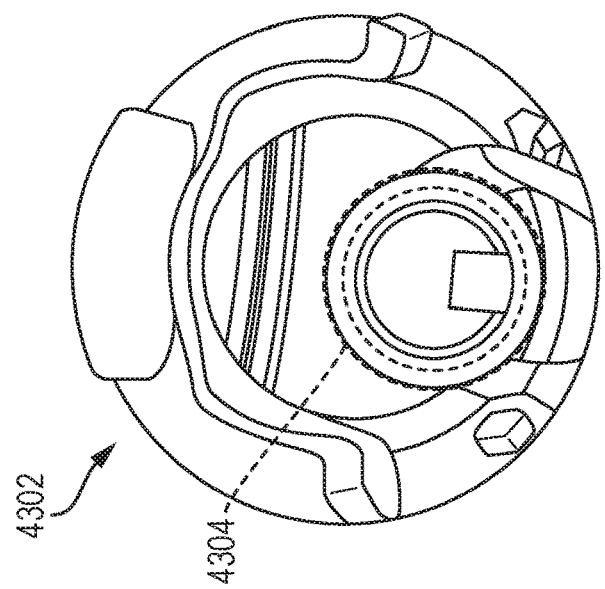
FIGS. 43-44 illustrate a position of a fuel nozzle within a refueling adapter including a nozzle guide.
Figure 43:
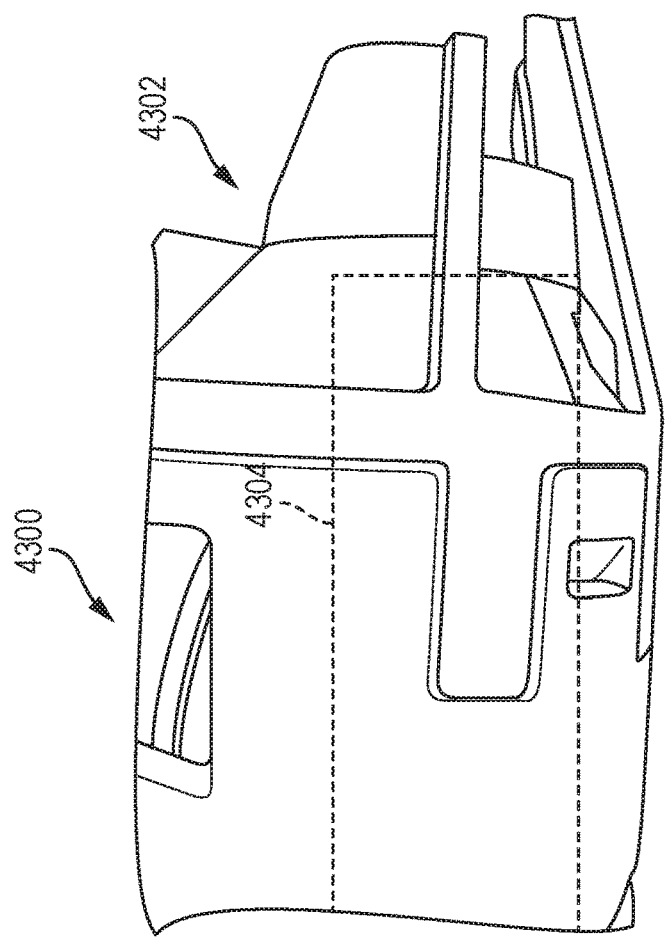

FIG. 41 shows another example of a fuel guide 4100 disposed within filler neck 3904. FIG. 42 further illustrates the flow of fuel vapor via arrow 3912 around a fuel guide 4200, with the fuel guide 4200 including a rear guard 4202 similar to rear guard 610 described above. FIGS. 43-44 illustrate a refueling adapter 4300 coupled to a nozzle guide 4302 (which may be referred to herein as a flow guide and/or nozzle flow guide), similar to refueling adapter 200 and nozzle guide 202, in one example. FIGS. 43-44 further illustrate a position of a fuel nozzle 4304 within each of the refueling adapter 4300 and nozzle guide 4302.

FIGS. 2-44 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In this way, by configuring the nozzle guide to couple to the refueling adapter and to include features such as the protrusions for centering the fuel nozzle within the refueling adapter and nozzle guide, a flow of fuel from the fuel nozzle may be guided more efficiently to the fuel tank via the fuel line. Additionally, by including the rear guard and upper wall of the nozzle guide, a flow of fuel vapor from the fuel tank may be guided back toward the fuel tank by the nozzle guide with a decreased amount of mixing of fuel vapor and liquid fuel, and an amount of splashing and/or backflow to the fuel nozzle may be reduced.

The technical effect of coupling the nozzle guide with the refueling adapter is to alter a flow path of fuel from the fuel nozzle while the fuel nozzle is inserted into the refueling adapter and nozzle guide.

In one embodiment, a nozzle guide for a vehicle refueling adapter comprises: a plurality of flexible protrusions adapted to guide a fuel nozzle to a centered position within the nozzle guide; a rear guard positioned to partially surround the fuel nozzle while the fuel nozzle is in the centered position and to guide fuel vapor around the nozzle guide; and a plurality of arms extending in a direction toward an axis on which the fuel nozzle is centered. In a first example of the nozzle guide, the plurality of flexible protrusions are positioned at a first end of the nozzle guide and the plurality of arms are positioned at an opposite, second end of the nozzle guide. A second example of the nozzle guide optionally includes the first example, and further includes wherein a stiffness of the plurality of arms is greater than a stiffness of the plurality of flexible protrusions. A third example of the nozzle guide optionally includes one or both of the first and second examples, and further includes a plurality of extensions, with each extension of the plurality of extensions including a tab adapted to engage with a counterpart slot of the vehicle refueling adapter. A fourth example of the nozzle guide optionally includes one or more or each of the first through third examples, and further includes wherein the plurality of extensions includes at least four extensions. A fifth example of the nozzle guide optionally includes one or more or each of the first through fourth examples, and further includes wherein the plurality of arms includes at least two arms positioned opposite to each other relative to the axis. A sixth example of the nozzle guide optionally includes one or more or each of the first through fifth examples, and further includes a lower ramped portion joined to the plurality of flexible protrusions. A seventh example of the nozzle guide optionally includes one or more or each of the first through sixth examples, and further includes wherein the plurality of flexible protrusions includes at least two flexible protrusions forming a space adapted to receive fuel from the fuel nozzle.

In one embodiment, a system comprises: a refueling adapter for a fuel filler neck; and a nozzle guide removably couplable to the refueling adapter, the nozzle guide including: a plurality of extensions adapted to engage the nozzle guide with the refueling adapter; a plurality of protrusions adapted to press against and center a fuel nozzle within the refueling adapter and nozzle guide; a lower ramped portion joined to the plurality of protrusions and adapted to support the fuel nozzle within the nozzle guide; and an upper wall forming an opening extending in a radial direction, away from the lower ramped portion. In a first example of the system, the refueling adapter is a capless refueling adapter including one or more pivotable doors. A second example of the system optionally includes the first example, and further includes wherein the plurality of protrusions are flexible in an outward direction, away from the centered fuel nozzle. A third example of the system optionally includes one or both of the first and second examples, and further includes wherein the refueling adapter is formed from a first material and the nozzle guide is formed from a different, second material.

In one embodiment, a method comprises: inserting a fuel nozzle into a nozzle guide coupled to a vehicle refueling adapter, downstream of the vehicle refueling adapter; engaging the fuel nozzle with a plurality of protrusions of the nozzle guide; and centering the fuel nozzle within the nozzle guide and vehicle refueling adapter via the plurality of protrusions. In a first example of the method, the method further includes flowing fuel vapor from a recirculation passage of the vehicle to a filler pipe of the vehicle downstream of the vehicle refueling adapter via an upper wall of the nozzle guide. A second example of the method optionally includes the first example, and further includes wherein flowing fuel vapor from the recirculation passage to the filler pipe includes flowing fuel vapor along the upper wall and a rear guard of the nozzle guide. A third example of the method optionally includes one or both of the first and second examples, and further includes pressing the fuel nozzle against the plurality of protrusions, and moving each protrusion of the plurality of protrusions in an outward direction relative to the fuel nozzle. A fourth example of the method optionally includes one or more or each of the first through third examples, and further includes wherein the nozzle guide and refueling adapter are formed together as a single piece, and wherein inserting the fuel nozzle into the nozzle guide includes inserting the fuel nozzle through the refueling adapter and into the nozzle guide. A fifth example of the method optionally includes one or more or each of the first through fourth examples, and further includes enclosing a shut-off aspirator of the fuel nozzle with the plurality of protrusions, the shut-off aspirator positioned within a space formed between each protrusion of the plurality of protrusions. A sixth example of the method optionally includes one or more or each of the first through fifth examples, and further includes wherein inserting the fuel nozzle into the nozzle guide further comprises engaging the fuel nozzle with a plurality of arms of the nozzle guide, the plurality of arms positioned at an opposite end of the nozzle guide relative to the plurality of protrusions. A seventh example of the method optionally includes one or more or each of the first through sixth examples, and further includes wherein engaging the fuel nozzle with a plurality of protrusions of the nozzle guide includes seating the fuel nozzle against the plurality of protrusions, the plurality of protrusions encircling a portion of the fuel nozzle.

In another embodiment, a nozzle guide for a vehicle refueling adapter comprises: a plurality of flexible protrusions adapted to guide a fuel nozzle to a centered position within the nozzle guide; and a rear guard positioned to partially surround the fuel nozzle while the fuel nozzle is in the centered position and to guide fuel vapor around the nozzle guide. In a first example of the nozzle guide, the plurality of flexible protrusions are positioned at a same end of the nozzle guide as the rear guard. A second example of the nozzle guide optionally includes the first example, and further includes wherein a stiffness of each flexible protrusion of the plurality of flexible protrusions is less than a stiffness of the rear guard. A third example of the nozzle guide optionally includes one or both of the first and second examples, and further includes wherein the nozzle guide further comprises a plurality of coupling features adapted to engage with counterpart coupling features of the vehicle refueling adapter to removably couple the nozzle guide with the vehicle refueling adapter. A fourth example of the nozzle guide optionally includes one or more or each of the first through third examples, and further includes wherein the plurality of flexible protrusions includes at least two flexible protrusions forming a space adapted to receive fuel from the fuel nozzle. A fifth example of the nozzle guide optionally includes one or more or each of the first through fourth examples, and further includes wherein the rear guard includes a first side and an opposing, second side, and wherein a length between the first side and the second side in a radial direction of the nozzle guide is greater than a length of the space in the radial direction. A sixth example of the nozzle guide optionally includes one or more or each of the first through fifth examples, and further includes wherein a length of the rear guard in an axial direction of the nozzle guide is less than a length of the plurality of protrusions in the axial direction. A seventh example of the nozzle guide optionally includes one or more or each of the first through sixth examples, and further includes wherein an outer surface of the nozzle guide tapers inward toward the rear guard from a first end of the nozzle guide toward a second end of the nozzle guide, the plurality of protrusions extending from the second end.

In another embodiment, a system for a vehicle comprises: a refueling adapter for a fuel filler neck; and a nozzle guide removably couplable to the refueling adapter, the nozzle guide including: a plurality of protrusions adapted to press against and center a fuel nozzle within the refueling adapter and nozzle guide; and an upper wall forming an opening extending in a radial direction, away from the plurality of protrusions. In a first example of the system, the refueling adapter is a capless refueling adapter including one or more pivotable doors. A second example of the system optionally includes the first example, and further includes wherein each protrusion of the plurality of protrusions is flexible in an outward direction, away from the centered fuel nozzle. A third example of the system optionally includes one or both of the first and second examples, and further includes wherein the refueling adapter is formed from a first material and the nozzle guide is formed from a different, second material.

In another embodiment, a method comprises: inserting a fuel nozzle into a nozzle guide coupled to a vehicle refueling adapter, downstream of the vehicle refueling adapter; engaging the fuel nozzle with a plurality of protrusions of the nozzle guide; and centering the fuel nozzle within the nozzle guide and vehicle refueling adapter via the plurality of protrusions. In a first example of the method, the method further comprises flowing fuel vapor from a recirculation passage of the vehicle to a filler pipe of the vehicle downstream of the vehicle refueling adapter via an upper wall of the nozzle guide. A second example of the method optionally includes the first example, and further includes wherein flowing fuel vapor from the recirculation passage to the filler pipe includes flowing fuel vapor along the upper wall and a rear guard of the nozzle guide, the rear guard position downstream of the upper wall. A third example of the method optionally includes one or both of the first and second examples, and further includes pressing the fuel nozzle against the plurality of protrusions, and moving each protrusion of the plurality of protrusions in an outward direction relative to the fuel nozzle. A fourth example of the method optionally includes one or more or each of the first through third examples, and further includes wherein the nozzle guide and vehicle refueling adapter are formed together as a single piece, and wherein inserting the fuel nozzle into the nozzle guide includes inserting the fuel nozzle through the vehicle refueling adapter and into the nozzle guide. A fifth example of the method optionally includes one or more or each of the first through fourth examples, and further includes enclosing a shut-off aspirator of the fuel nozzle with the plurality of protrusions, the shut-off aspirator positioned within a space formed between each protrusion of the plurality of protrusions while the fuel nozzle is centered within the nozzle guide. A sixth example of the method optionally includes one or more or each of the first through fifth examples, and further includes wherein inserting the fuel nozzle into the nozzle guide further comprises engaging the fuel nozzle with a plurality of coupling features of the nozzle guide positioned at an opposite end of the nozzle guide relative to the plurality of protrusions. A seventh example of the method optionally includes one or more or each of the first through sixth examples, and further includes wherein engaging the fuel nozzle with the plurality of protrusions of the nozzle guide includes seating the fuel nozzle against each protrusion of the plurality of protrusions, the plurality of protrusions encircling a portion of the fuel nozzle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A system for a vehicle, comprising:
a capless vehicle refueling adapter for a fuel filler neck; and
a base portion of a nozzle guide removably couplable to
a distal end of the vehicle refueling adapter downstream of one or more pivotable doors, the nozzle guide comprising:
a base portion coupled to the distal end of the vehicle refueling adapter;
a plurality of flexible protrusions extending in a downstream direction from the distal end of the vehicle refueling adapter on each side of an open space at a bottom of the nozzle guide and the plurality of flexible protrusions contacting a bottom side of a fuel nozzle;
a rear guard extending in the downstream direction from the distal end of the vehicle refueling adapter and positioned above the open space and partially surrounding a top side of the fuel nozzle to guide fuel vapor around the nozzle guide; and
an opening in an upper wall of the nozzle guide downstream of the distal end of the vehicle refueling adapter.

2. The system of claim 1, wherein the plurality of flexible protrusions and the rear guard extend in the downstream direction from the distal end of the vehicle refueling adapter and toward a center axis of an inserted nozzle.

3. The system of claim 1, wherein a stiffness of each flexible protrusion of the plurality of flexible protrusions is less than a stiffness of the rear guard.

4. The system of claim 1, wherein the nozzle guide further comprises one or more apertures positioned downstream of the distal end of the vehicle refueling adapter on the bottom side of the nozzle guide and in an upstream direction of the plurality of flexible protrusions.

5. The system of claim 1, wherein the open space between the plurality of flexible protrusions receives fuel from the fuel nozzle inserted through the vehicle refueling adapter and into the nozzle guide.

6. The system of claim 5, wherein the rear guard includes a first side and an opposing, second side, and wherein a length between the first side and the second side in a radial direction of the nozzle guide is greater than a length of the open space in the radial direction.

7. The system of claim 5, wherein a length of the rear guard in an axial direction of the nozzle guide is less than a length of the plurality of flexible protrusions in the axial direction.

8. The system of claim 5, wherein an outer surface of the nozzle guide tapers inward toward the rear guard from the distal end of the vehicle refueling adapter toward a distal end of the nozzle guide, the plurality of flexible protrusions extending from the second end.

9. A system for a vehicle, comprising:
a capless refueling adapter for a fuel filler neck; and
a base portion of a nozzle guide removably couplable to
a distal end of the refueling adapter downstream of one or more pivotable doors, the nozzle guide including:
a plurality of protrusions extending downstream from the distal end of the refueling adapter and pressing against and centering a fuel nozzle within the refueling adapter and the nozzle guide;
a rear guard extending downstream from the distal end of the refueling adapter, tapering toward a center axis of an inserted fuel nozzle;
rear arms extending downstream from the distal end of the refueling adapter along the rear guard;
a cavity through the nozzle guide positioned between two of the plurality of protrusions positioned below the inserted fuel nozzle;
two apertures through the nozzle guide positioned on each side of the two protrusions on the sides of the cavity;
an upper wall extending downstream from the distal end of the refueling adapter and an opening through the upper wall; and
the opening through the upper wall positioned on a side of the nozzle guide proximate to a fuel vapor recirculation passage, and the fuel vapor recirculation passage positioned downstream from the distal end of the refueling adapter.

10. The system of claim 9, wherein each protrusion of the plurality of protrusions is flexible in an outward direction, away from the centered fuel nozzle.

11. The system of claim 9, wherein the refueling adapter is formed from a first material and the nozzle guide is formed from a different, second material.

12. A method, comprising:
coupling a base portion of a nozzle guide to a distal end of a capless vehicle refueling adapter downstream of one or more pivotable doors;
inserting a fuel nozzle through the capless vehicle refueling adapter and one or more pivotable doors into the nozzle guide;
engaging the fuel nozzle with a plurality of protrusions extending downstream from the distal end of the capless vehicle refueling adapter;

contacting and centering the fuel nozzle within the nozzle guide and the vehicle refueling adapter via the plurality of protrusions extending from the base portion;

flowing fuel through a space between the protrusions; and receiving fuel vapor through an opening in an upper wall of the nozzle guide downstream of the capless vehicle refueling adapter.

13. The method of claim 12, further comprising flowing fuel vapor from a recirculation passage downstream of the vehicle refueling adapter via the upper wall of the nozzle guide.

14. The method of claim 13, wherein flowing fuel vapor from the recirculation passage includes flowing fuel vapor along the upper wall and the rear guard of the nozzle guide, a rear guard positioned downstream of the upper wall.

15. The method of claim 12, further comprising pressing the fuel nozzle against the plurality of protrusions, and moving each protrusion of the plurality of protrusions in an outward direction relative to the fuel nozzle.

16. The system of claim 1, wherein the nozzle guide and vehicle refueling adapter are formed together as a single piece, and wherein inserting the fuel nozzle into the nozzle guide includes inserting the fuel nozzle through the vehicle refueling adapter and into the nozzle guide.

17. The method of claim 12, further comprising enclosing a shut-off aspirator of the fuel nozzle with the plurality of protrusions, the shut-off aspirator positioned within the space formed between each protrusion of the plurality of protrusions while the fuel nozzle is centered within the nozzle guide.

18. The method of claim 12, wherein engaging the fuel nozzle with the plurality of protrusions of the nozzle guide includes seating the fuel nozzle against each protrusion of the plurality of protrusions, the plurality of protrusions encircling a portion of the fuel nozzle.

* * * * *